US009851605B2

(12) United States Patent
Watanabe et al.

(10) Patent No.: US 9,851,605 B2
(45) Date of Patent: Dec. 26, 2017

(54) DISPLAY PANEL

(71) Applicant: Sharp Kabushiki Kaisha, Osaka (JP)

(72) Inventors: Hisashi Watanabe, Osaka (JP);
Masayuki Kanehiro, Osaka (JP);
Youhei Nakanishi, Osaka (JP)

(73) Assignee: SHARP KABUSHIKI KAISHA, Osaka (JP)

( * ) Notice: Subject to any disclaimer, the term of this patent is extended or adjusted under 35 U.S.C. 154(b) by 97 days.

(21) Appl. No.: 14/914,548

(22) PCT Filed: Aug. 4, 2014

(86) PCT No.: PCT/JP2014/070477
§ 371 (c)(1),
(2) Date: Feb. 25, 2016

(87) PCT Pub. No.: WO2015/029704
PCT Pub. Date: Mar. 5, 2015

(65) Prior Publication Data
US 2016/0202515 A1    Jul. 14, 2016

(30) Foreign Application Priority Data
Aug. 29, 2013  (JP) ................................ 2013-178271

(51) Int. Cl.
*G02F 1/1339*    (2006.01)
*G06F 1/16*    (2006.01)
*G02F 1/1341*    (2006.01)

(52) U.S. Cl.
CPC ............ *G02F 1/1339* (2013.01); *G06F 1/169* (2013.01); *G06F 1/1643* (2013.01); *G02F 1/1341* (2013.01)

(58) Field of Classification Search
CPC ...... G06F 1/1643; G06F 1/169; G02F 1/1339; G02F 1/1341
See application file for complete search history.

(56) References Cited

U.S. PATENT DOCUMENTS 3,967,882 A * 7/1976 Kubota ............. G02F 1/133711
29/592.1
3,990,781 A * 11/1976 Gum ..................... G02F 1/1339
349/149

(Continued)

FOREIGN PATENT DOCUMENTS

| JP | 57-53727 A | 3/1982 |
| JP | 57-201219 A | 12/1982 |

(Continued)

*Primary Examiner* — James Dudek
(74) *Attorney, Agent, or Firm* — Chen Yoshimura LLP

(57) ABSTRACT

A display panel includes a substrate and a display medium layer held on the substrate and has a display region and a frame region outside the display region and a hole on an inner side of the frame region penetrating the substrate and the display medium layer. The display panel further includes a hole-periphery sealing part disposed on the substrate at a side facing the display medium layer so as to surround the hole, in which the hole-periphery sealing part is made of: a first sealing member having a broken loop shape, surrounding the hole, having at least one open section; and at least one second sealing member provided at a location corresponding to the one open section so as to seal said at least one open section.

4 Claims, 16 Drawing Sheets

(56) References Cited

U.S. PATENT DOCUMENTS

| | | | | |
|---|---|---|---|---|
| 3,995,941 | A * | 12/1976 | Nagahara | C03C 8/245 |
| | | | | 101/129 |
| 4,023,259 | A * | 5/1977 | Kubota | G02F 1/1339 |
| | | | | 156/145 |
| 4,385,807 | A * | 5/1983 | Perbet | G02F 1/1333 |
| | | | | 349/23 |
| 6,078,379 | A * | 6/2000 | Nagae | G02F 1/1339 |
| | | | | 349/153 |
| 6,573,957 | B1 * | 6/2003 | Suzuki | G02F 1/13336 |
| | | | | 349/110 |
| 2009/0051636 | A1 | 2/2009 | Natori | |
| 2011/0285934 | A1 | 11/2011 | Watanabe | |
| 2016/0011633 | A1 | 1/2016 | Watanabe et al. | |

FOREIGN PATENT DOCUMENTS

| | | |
|---|---|---|
| JP | 4-204715 A | 7/1992 |
| JP | 2002-67737 A | 3/2002 |
| JP | 2004-329694 A | 11/2004 |
| JP | 2005-46352 A | 2/2005 |
| JP | 2009-47902 A | 3/2009 |
| JP | 2010-139657 A | 6/2010 |
| WO | 2010/089998 A1 | 8/2010 |
| WO | 2014/141893 A1 | 9/2014 |

* cited by examiner (a1)

(a2)

(a3)

(a4)

(a)

(b)

(a1)

(a2)

(b1)

(b2)

(c1)

(c2)

(a1)

(a2)

(a3)

(a4)

(b1)

(b2)

(c1)

(c2)

(a1)

(a2)

(a3)

(a4)

(b1)            (b2)

(b3)

(a1)

(a2)

(a3)

(a4)

(b1)

(b2)

(b3)

(a1)

(a2)

(a3)

(a4)

(a1)

(a2)

(a3)

(a4)

(a1)

(a2)

(a3)

(a4)

(b1)

(b2)

(b3)

(b2')

(b4)

DISPLAY PANEL

TECHNICAL FIELD

The present invention relates to a display panel having a hole in the display region thereof.

BACKGROUND ART

In general, transmissive liquid crystal display devices usually include a liquid crystal panel, a backlight unit, a circuit substrate and a power supply for supplying various types of electrical signals to the liquid crystal panel, a case for housing these, and the like.

The liquid crystal panel has a display region (active area) within which a plurality of pixels are arranged and a frame region (non-active area) outside the display region. The display region has pixel electrodes, TFTs, and the like, and displays an image or video. A sealing member for sealing liquid crystal material between substrates, wiring connected to scan lines or signal lines, a monolithically-formed driver circuit, terminals connected to an external driver circuit, and the like are arranged on the frame region, and the frame region is not used for displaying an image or video.

The frame region of the liquid crystal panel does not contribute to display, and it is therefore preferable that the frame region be made narrow. Yet, while the frame region of liquid crystal panels has been progressively narrowed over the years, completely eliminating the frame region is difficult in principle.

Conventional research has focused on narrowing or obscuring the frame region of the display panel. The subject applicants have disclosed in Patent Document 1 a display device in which a transmissive cover is disposed on the viewer side of the display panel. The edge of the transmissive cover in this display device has a convex curved portion that function as a lens.

The convex curved portion (lens portion) of the transmissive cover is typically disposed so as to cover the frame region of the display panel and a part of the display region near the frame region (hereinafter, also referred to as the "peripheral display region"). Light emitted from the pixels (peripheral pixels) in the peripheral display region refracts at the lens portion. This results in the image formed by the peripheral pixels being magnified and displayed on the front side of the frame region. Because of this effect, the frame region becomes obscured or appears as if the frame region does not exist.

The display device described above makes possible for almost the entire panel surface on the viewer side of a portable electronic device such as a smartphone to be used as a display region, for example. This type of electronic device has a large area capable of content display relative to its size and is thus advantageous in terms of making the device more compact.

RELATED ART DOCUMENTS

Patent Documents

Patent Document 1: WO 2010/089998
Patent Document 2: Japanese Patent Application Laid-Open Publication No. 2005-46352
Patent Document 3: Japanese Patent Application Laid-Open Publication No. 2009-47902
Patent Document 4: Japanese Patent Application Laid-Open Publication No. 2004-329694

SUMMARY OF THE INVENTION

Problems to be Solved by the Invention

Although there are attempts, as described above, to use the entire viewer side surface (front side of the panel) for display, eliminating the frame region completely would also eliminate the space on the front side of the panel where a physical button, a camera, or the like is arranged conventionally. Regarding this point, the subject applicants have disclosed in International PCT Application No. PCT/JP2014/054966 a configuration in which a through-hole is provided on the inner side of the frame region of the display panel, namely within the display region, and a button or the like is provided in this through-hole.

Patent Documents 2 to 4 also have disclosed a configuration in which a through-hole is provided in the display region of the liquid crystal panel, for example. Patent Documents 2 and 3 have disclosed a display device having a configuration in which wiring for driving pixels is arranged so as to avoid the through-hole. Also, Patent Document 4 has mentioned a sealing member and spacers provided around the hole.

The research by the inventors of the present invention, however, has revealed that, in the conventional configuration, providing a through-hole in the display panel is likely to degrade display quality around the hole.

The present invention has been developed to solve the problems described above and aims to prevent the degradation of display quality around the hole in a display panel that has a hole therein.

Means for Solving the Problems

A display panel according to an embodiment of the present invention includes: a substrate; a display medium layer held on the substrate, the display panel having a display region and a frame region outside the display region and including a hole within the frame region penetrating the substrate and the display medium layer; and a hole-periphery sealing part disposed on the substrate at a side facing the display medium layer so as to surround the hole, wherein the hole-periphery sealing part includes: a first sealing member having a loop shape surrounding the hole or a broken loop shape having at least one open section; and at least one second sealing member provided at a location corresponding to a part of the loop defined by the first sealing member or to the at least one open section.

In one embodiment, the first sealing member is formed in the broken loop shape having the at least open section, and the at least one second sealing member is a sealing member that seals an opening formed by the at least one open section.

In one embodiment, the first sealing member is formed in the loop shape, and the at least one second sealing member is a protruding structure provided so as to overlap with the part of the loop defined by the first sealing member.

In one embodiment, a thickness of the protruding structure is 30% to 100% of a thickness of the display medium layer.

In one embodiment, the first sealing part is formed by a sealing member provided on the substrate so as to form a broken loop shape having at least one open section, and wherein the at least one second sealing part is provided at a location corresponding to the open section of the sealing member.

A display panel according to an embodiment of the present invention includes a substrate and a display medium layer held on the substrate, the display panel having a display region and a frame region outside the display region and including a hole on an inner side of the frame region penetrating the substrate and the display medium layer, the display panel further including: a hole-periphery sealing part formed by expanding, in a planar direction, a sealing member having a dot shape or a planar shape that is provided, before the hole is formed, at a location on the substrate where the hole is to be formed, the substrate further having a restricting structure that hinders the expansion of the sealing member.

In one embodiment, the restricting structure is a bank-like loop-shaped structure glued to an outer side of the hole-periphery sealing part and surrounding the hole-periphery sealing part.

A display panel according to an embodiment of the present invention includes: a substrate; a display medium layer held on the substrate, the display panel having a display region and a frame region outside the display region and including a hole within the frame region penetrating the substrate and the display medium layer; a hole-periphery sealing part disposed on the substrate at a side facing the display medium layer so as to surround the hole; and a layered structure provided on the substrate, the layered structure covering the display region, wherein a loop-shaped region where the layered structure is not formed is provided around the hole, and the hole-periphery sealing part is arranged in the loop-shaped region.

In one embodiment, the substrate is an opposite substrate, and the layered structure includes a color filter layer.

An electronic device according an embodiment of the present invention includes: any one of the display panels described above; and an input/output device arranged in the hole in the display panel.

A method of manufacturing a liquid crystal panel according to an embodiment of the present invention includes: a step of preparing a pair of substrates; a step of providing an outer sealing member having a closed-loop shape along a periphery of one of the pair of substrates and a hole-periphery sealing member in a broken loop shape, a dot shape, or a planar shape at a prescribed location within a region inside the outer sealing member; a step of dripping liquid crystal material on a location inside the outer sealing member and outside the hole-periphery sealing member in the one of the substrates; and a step of bonding one substrate on which the liquid crystal material is dripped to another substrate, wherein the method further includes a step of forming the hole-periphery sealing part in a loop shape or a planar shape by curing the hole-periphery sealing member after flattening the hole-periphery sealing member between the pair of substrates and spreading the liquid crystal material between the pair of substrates, and a step of forming a through-hole within the hole-periphery sealing part in the loop shape or the planar shape.

Effects of the Invention

According to a display device of embodiments of the present invention, a display device using a display panel that has a through-hole in the display surface thereof can prevent the degradation of display quality around the hole.

BRIEF DESCRIPTION OF THE DRAWINGS

FIG. 2(a) is a plan view, and FIG. 2(b) is a cross-sectional view along the line x-x in FIG. 2(a).

FIG. 4(a) is a plan view, and FIG. 4(b) is a cross-sectional view along the line x-x in FIG. 4(a).

FIG. 6(a) is a plan view, and FIG. 6(b) is a cross-sectional view along the line x-x in FIG. 6(a).

FIG. 12(a) is a plan view, and FIG. 12(b) is a cross-sectional view along the line x-x in FIG. 12(a).

FIG. 13(a) is a plan view showing the location where liquid crystal is dropped or the like when forming a liquid crystal layer by the ODF method, FIG. 13(b) is a cross-sectional view along the line x-x in FIG. 13(a), and FIG. 13(c) is a cross-sectional view that corresponds to FIG. 13(b) after substrate bonding.

DETAILED DESCRIPTION OF EMBODIMENTS

Before describing embodiments of the present invention, causes of display anomalies around a hole that can occur in the display region of a display panel provided with a hole in the display region thereof will be described.

The subject applicants have disclosed in International PCT Application No. PCT/JP2014/054966 a display device in which a through-hole is formed in the display region thereof. Various types of input devices such as a button, a cross-shaped key, a camera, or the like are arranged in this through-hole. All the contents disclosed in International PCT Application No. PCT/JP2014/054966 are incorporated by reference in the present specification.

When a through-hole is provided in the display region of a liquid crystal panel as a display panel, in order to appropriately seal liquid crystal material between substrates, liquid crystal material should be made not to leak from the hole, for example. For this purpose, in addition to providing an outer frame sealing part along the periphery of the substrates, liquid crystal material needs to be sealed in between the substrates by providing a hole-periphery sealing part that penetrates through the substrates.

Figure 16:
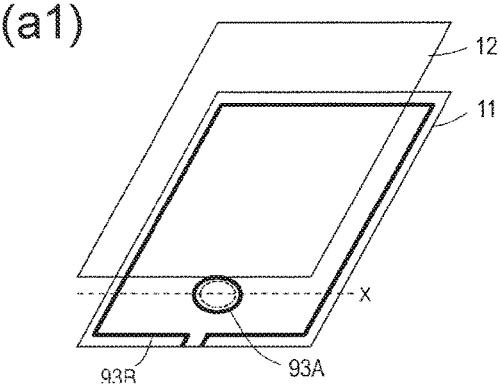
FIG. 16 is a view for describing the manufacturing process of a liquid crystal panel of a reference example, FIGS. 16(a1) to 16(a4) each show different steps, and FIGS. 16(b1) to 16(b4) are cross-sectional views that respectively correspond to FIGS. 16(a1) to 16(a4).
Figure 16:
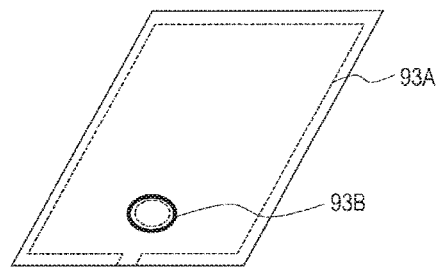
Figure 16:
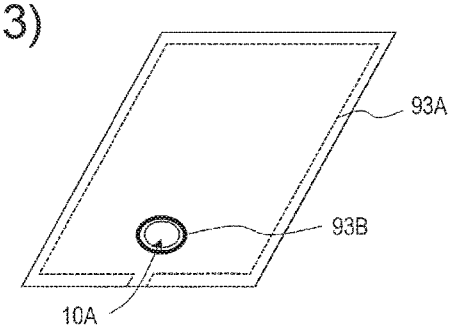
Figure 16:
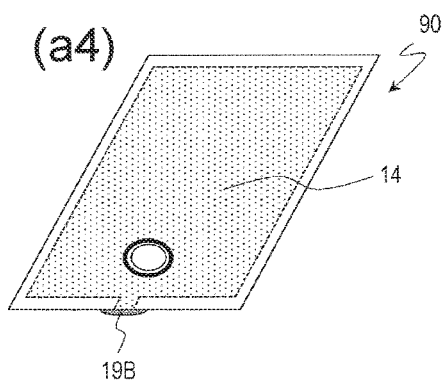
Figure 16:
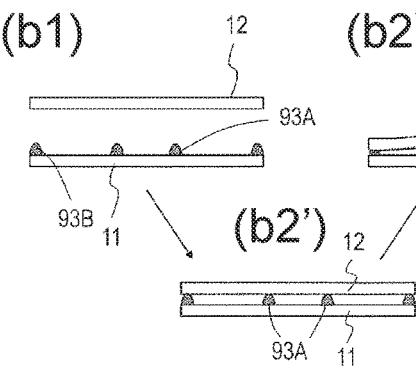
Figure 16:
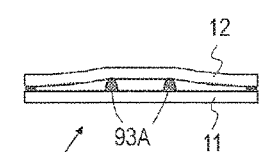
Figure 16:
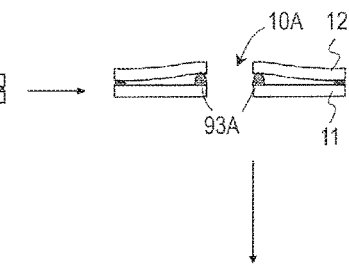
Figure 16:
Figure 16:
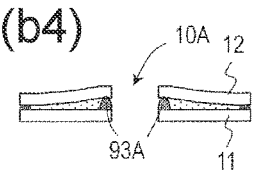

FIGS. 16(a1) to 16(a4) and 16(b1) to 16(b4) show a manufacturing process of a liquid crystal panel according to a reference example.

First, as FIGS. 16(a1) and 16(b1) show, a sealing member having a prescribed width (an outer sealing member 93B) is provided along the periphery of one of the substrates (here, a TFT substrate 11). The outer sealing member 93B is provided in a loop-shape, except the part where the injection hole used to inject liquid crystal material after the substrates are bonded together is located.

In this step, a sealing member (a hole-periphery sealing member 93A) is also provided around the area where a through-hole 10A (see FIGS. 16(a3) and 16(b3)) is formed in a subsequent step. In a manufacturing process of the present reference example, in order to prevent liquid crystal material from leaking from the hole 10A, the sealing member 93A having a closed-loop shape is provided so as to surround the area where the hole 10A should be formed.

In the next step, as shown in FIGS. 16(a2) and 16(b2), the substrate provided with the sealing members 93A and 93B is bonded to the other substrate (here, an opposite substrate 12). In this bonding process, however, as soon as the hole-periphery sealing member 93A makes contact with the other substrate 12, as shown in FIG. 16(b2'), an airtight space is formed inside the hole-periphery sealing member 93A, which makes it impossible to take the air out of the space.

In this situation, as shown in FIG. 16(b2), the inventors of the present invention verified that the cell thickness tends to become thicker around the hole even when relatively strong pressure is applied to both of the substrates 11 and 12. In particular, the inventors found that the cell thickness tends to become thicker around the hole than in other areas when providing a hole with a small diameter less than or equal to about 10 mm because it becomes harder to take the air out of the space.

Thereafter, a liquid crystal panel 90 is obtained by forming the hole 10A that penetrates both of the substrates 11 and 12 (FIGS. 16(a3) and 16(b3)), further forming a liquid crystal layer 14 by injecting liquid crystal material using a vacuum injection method, and finally sealing the injection hole with a resin 19B (FIGS. 16(a4) and 16(b4)).

However, when a liquid crystal panel is made using the method described above, various types of anomalies can occur around the hole 10A such as uneven display (lowered contrast ratio, reduced brightness, change in chromaticity, or the like), degradation in the viewing angle characteristics, and reduction in response speed. This is because the cell thickness around the hole 10A becomes thicker than that in other parts as described above.

In view of this problem, the inventors of the present invention found that, in order to prevent the degradation of display quality around the hole, it is effective to perform the substrate bonding process by securing a way for the air to escape so as not to form an airtight space inside the sealing member provided around the hole. Alternatively, the inventors found that it is effective to provide the hole-periphery sealing member, not in a closed-loop shape, but in a dot shape or a planar shape, and to form the sealing part by flattening out the sealing member. Because this method can make the cell thickness around the hole uniform, the degradation of display quality can be prevented.

A display panel according to embodiments of the present invention is described in greater detail below with reference to figures, but the present invention is not limited to these embodiments.

Embodiment 1

Figure 1:
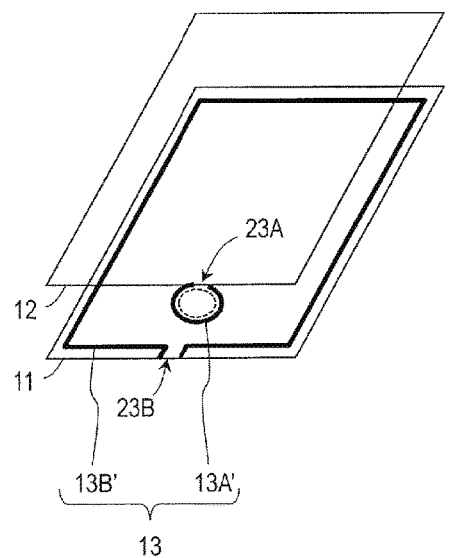
FIG. 1 is a view for describing a manufacturing process of a liquid crystal panel according to Embodiment 1 of the present invention, and FIGS. 1(a1) to 1(a4) each show different steps.
Figure 1:
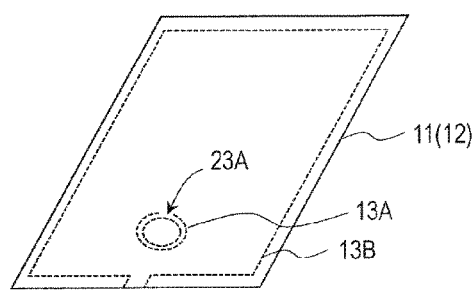
Figure 1:
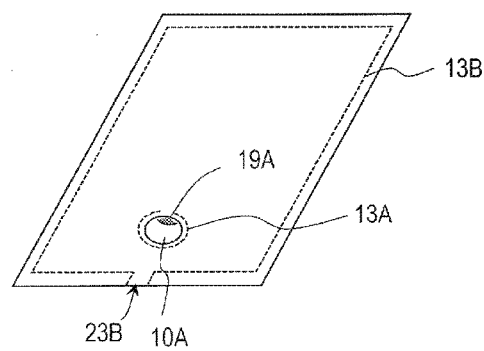
Figure 1:
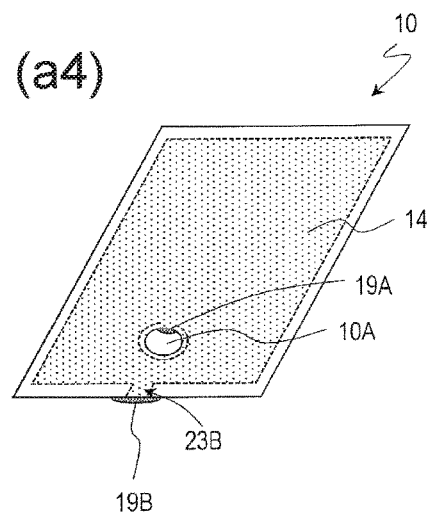

FIGS. 1(a1) to 1(a4) are perspective views showing part of a manufacturing process of a liquid crystal panel according to Embodiment 1.

After manufacturing the TFT substrate 11 and the opposite substrate 12 by a known method, as shown in FIG. 1(a1), the sealing member 13 is provided on one of the substrates (here, the TFT substrate 11).

The sealing member 13 is provided in a line-shape having a width of approximately 1 mm using a known dispenser device, for example. An ultraviolet curable or thermosetting resin material (acrylic resin or the like) can be used as a material for the sealing member 13, and "Photolec," which is a UV curable sealing member made by Sekisui Chemical Co., Ltd., or the like can be used, for example.

In the process of providing the sealing member 13, an outer sealing member 13B' having an outer frame-shape is provided on the periphery of the TFT substrate 11, and a hole-periphery sealing member 13A' is provided around the area where the through-hole 10A (see FIG. 1(a3)) is formed in a subsequent step. The hole-periphery sealing member 13A' is provided within the area enclosed by the outer sealing member 13B'.

The outer sealing member 13B' includes a portion that extends to an edge of the substrate 11. This portion forms an injection hole 23B used when injecting liquid crystal material by a vacuum injection method.

The hole-periphery sealing member 13A' is provided in a loop-shape with an open section 23A (in other words, a broken loop-shape). Although the FIGS. 1(*a*1) to 1(*a*4) show a configuration in which the open section 23A is provided in one location, a plurality of the open sections 23A may be provided. In that case, the plurality of the open sections 23A may be formed so as to subdivide the hole-periphery sealing member 13A' into equal sections, for example.

Next, as shown in FIG. 1(*a*2), the TFT substrate 11 is bonded to the opposite substrate 12. In this step, the space inside the hole-periphery sealing member 13A' is connected to the space outside thereof even after the TFT substrate 11 is bonded to the opposite substrate 12 because the hole-periphery sealing member 13A' includes the open section 23A. In other words, in the substrate bonding process, the inside of the hole-periphery sealing member 13A' does not become an airtight space, and the state in which the air can be taken out is maintained. In this configuration, even the area provided with the hole-periphery sealing member 13A' maintains a cell gap that is the same as those in other areas.

In this manner, the outer sealing part 13B and the hole-periphery sealing part 13A are formed, and the process of bonding the substrates 11 and 12 together is completed by hardening the sealing member 13 with heat or ultraviolet light after arranging the TFT substrate 11 and the opposite substrate 12 to face each other while keeping the cell gap within the surface uniform. Providing a plurality of photo-spacers having the same height over the entire substrate surface of the opposite substrate 12 makes it easier to maintain the cell gap over the entire panel surface at a desired thickness.

Next, as shown in FIG. 1(*a*3), the through-hole 10A (the hole 10A) that penetrates the TFT substrate 11 and the opposite substrate 12 are formed in the inner side of the hole-periphery sealing part 13A. The hole 10A can be formed by scribing (laser scribing or mechanical scribing), by using a laser, a drill, or the like, or by waterjet cutting, for example.

Furthermore, after the hole 10A is formed, a sealing resin 19A is disposed at the location that corresponds to the open section 23A of the hole-periphery sealing part 13A. The sealing resin 19A is provided so as to fill the open section 23A of the hole-periphery sealing part 13A from the inner side of the hole 10A. A photosensitive resin sealing material made by Sekisui Chemical Co., Ltd. can be used as the material for the sealing resin 19A, for example.

In this manner, a space that is sealed from the outside, except for the liquid crystal injection hole 23B, is formed between the substrates 11 and 12, and a so-called empty cell is completed. In the present embodiment, the hole-periphery sealing part 13A and the sealing resin 19A seal the area surrounding the hole 10A.

Thereafter, as shown in FIG. 1(*a*4), the liquid crystal material is injected into the empty cell using the pressure difference created by placing the empty cell in a vacuum and returning the cell under the atmospheric pressure while the liquid crystal injection hole 23B is in contact with liquid crystal material. After liquid crystal fills the inside of the empty cell, the liquid crystal injection hole 23B is sealed with the sealing resin 19B from the outer side of the panel, and the liquid crystal layer 14 is formed by completely sealing the liquid crystal material between the substrates. This step completes the liquid crystal panel 10.

The liquid crystal panel 10 according to the present embodiment thus manufactured prevents uneven display (lowered contrast ratio, reduced brightness, change in chromaticity, or the like), degradation in the viewing angle characteristics, reduction in response speed, or the like because the cell thickness near the hole 10A does not become thick.

Below, a liquid crystal display device 100 that includes the liquid crystal panel 10 manufactured in a manner shown in FIGS. 1(*a*1) to 1(*a*4) will be described.

Figure 2:
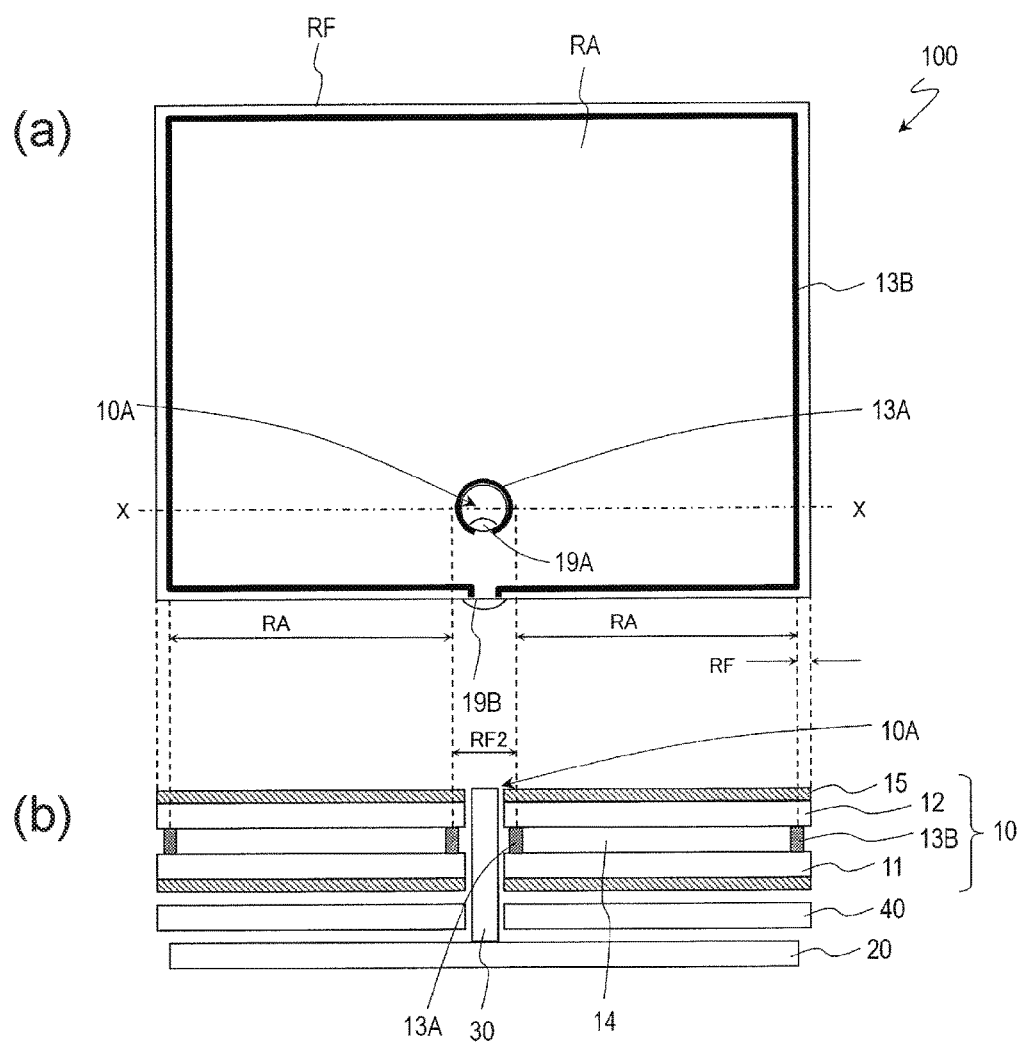
FIG. 2 is a view showing a configuration of a liquid crystal display device 100 of Embodiment 1.

FIGS. 2(*a*) and 2(*b*) are a plan view and a cross sectional view, respectively, that show the liquid crystal display device 100 according to the present embodiment. The liquid crystal display device 100 may be various types of electronic devices as long as the device includes the liquid crystal panel 10. In the present specification, all electronic devices that include the liquid crystal panel 10 may be referred to as "liquid crystal display devices."

The liquid crystal display device 100 (alternatively, an electronic device) may be a portable gaming device, smartphone, mobile phone, PDA (personal digital assistant), tablet terminal, electronic book reader, music player, camera, electronic dictionary, electronic notebook, navigation system, display device, personal computer, wearable computer, wrist watch, game machine, television, information display, or the like, for example.

A liquid crystal display device that uses a liquid crystal layer as a display medium layer is used below as an example. However, the present invention is not limited to the example. In various types of electronic devices that use liquid crystal material other than liquid crystal material for the display medium layer such as an electrophoretic display device or an electrowetting display device, the same configuration as that described below can be applied.

As shown in FIGS. 2(*a*) and 2(*b*), the liquid crystal display device 100 includes the liquid crystal panel 10 and a circuit substrate 20 arranged on the back side of the liquid crystal panel 10. The liquid crystal display device 100 is a transmissive liquid crystal display device and includes a backlight 40 provided between the liquid crystal panel 10 and the circuit substrate 20.

The backlight 40 may be an edge-lit backlight that has, in addition to light sources such as LEDs, optical elements such as a light guide plate, diffusion plate, reflective plate, and the like, or the backlight 40 may be a direct-lit (surface-emitting type) backlight that is configured using surface-emitting elements or the like.

The liquid crystal panel 10 includes the TFT substrate 11 (active matrix substrate) having pixels arranged in an array, the opposite substrate 12 that opposes the TFT substrate 11, and the liquid crystal layer 14 that is held between the pair of these substrates. An optical film layer 15 constituted by a polarizing plate, a retardation film, or the like is boded via an adhesive layer to the outer side of the TFT substrate 11 and the opposite substrate 12.

There may be various types of display modes of the liquid crystal display device 100. In the vertical alignment (VA) mode that performs full color display, for each of the pixels, a TFT and a pixel electrode connected thereto are provided on the TFT substrate 11, and a common electrode, a color filter, a black matrix, and the like are provided on the opposite substrate 12, for example. In a horizontal electric field mode such as FFS (fringe field switching) mode, the TFT substrate 11 includes pixel electrodes having a plurality of slits and elongated electrodes and common electrodes used to create horizontal electric fields between the common electrodes and these pixel electrodes. In the display mode using PDLC (polymer dispersed liquid crystal), the optical film layer 15 does not need to be included.

In the liquid crystal display device 100 of the present embodiment, the hole 10A that penetrates the panel is provided within a frame region RF (namely, a display region RA). As described using FIG. 1, the hole-periphery sealing part 13A having the open section 23A and the sealing resin 19A that seals the opening formed by the open section 23A are provided around the hole 10A. In this configuration, the liquid crystal layer 14 is sealed between the pair of substrates 11 and 12 by the outer sealing part 13B provided on the panel periphery, the injection hole sealing resin 19B, the hole-periphery sealing part 13A, and the sealing resin 19A.

It should be noted that, in the present specification, the area on the inner side of the frame region RF, which is formed at the periphery of the liquid crystal panel 10, is referred to, for convenience, as the "display region RA." However, the display region RA may include a region that does not contribute to display (non-display region other than the frame region). In the present embodiment, as shown in FIG. 2(b), a non-display region RF2 is formed within the display region RA around the hole 10A. The non-display region RF2 includes the hole 10A itself, the hole-periphery sealing part 13A, a region provided with a light-shielding member (not shown) that prevents light leakage around the hole 10A, and the like.

The diameter of the hole 10A may be arbitrarily set; however, the diameter is set to about 1 mm to about 15 mm, for example. When the diameter of the hole 10A is less than or equal to 10 mm, using the configuration according to the embodiments of the present invention is particularly effective in preventing the degradation of display quality around the hole. Here, although an example in which the planar shape of the hole 10A is circular is shown, the hole may have other planar shapes such as a square.

In the present embodiment, the liquid crystal display device 100 includes an input/output device 30 arranged in the hole 10A provided within the display area RA. The input/output device 30 is a push-down electronic switch, for example, and a hardware button provided in a smartphone corresponds to the switch, for example.

Now, the input/output device 30 is described in greater detail. In the liquid crystal display device 100, the input/output device 30 is arranged inside the hole 10A of the liquid crystal panel 10 and connected to the circuit substrate 20 via a connector. In the present embodiment, a through-hole is provided also on the backlight 40 arranged between the liquid crystal panel 10 and the circuit substrate 20, and the input/output device 30 is connected to the circuit substrate 20 by passing through the hole that penetrates the liquid crystal panel 10 and the backlight 40.

The input/output device 30 may be various types of devices such as a mechanical/electrical switch or button that receives input from the user, an optical element capable of receiving light from outside, a sound/speech output device, or a light-emitting device.

More specifically, the input/output device 30 may be a push-button, direction key (cross-shaped key), analog stick, touch panel (touch sensor), rotary switch (volume controller), rotatable selector (jog dial), toggle switch, trackball, trackpad, stick-type pointing device, hardware keyboard, or the like that can receive input (direct operation) from the user.

In addition, the input/output device 30 includes an imaging device (CCD image sensor, CMOS image sensor, or the like), an optical element (fiber optic faceplate or the like), or an optical sensor (a light sensor, a proximity sensor, or the like) that can receive optical input. Besides these, the input/output device may be a temperature sensor, a microphone, an input terminal such as HDMI (registered trademark) or USB, a wiring terminal such as a plug or outlet, or the like.

Furthermore, the input/output device 30 may be a sound/speech output device such as a speaker, a light-emitting device such as an LED, a display device that operates by itself independent of the liquid crystal panel 10, or the like.

The input/output device 30 is connected to the circuit substrate 20 arranged on the back side of the display panel either mechanically, electrically, or optically. A signal from the input/output device 30 or a signal to the input/output device 30 may be processed and generated in various types of processing devices provided on the circuit substrate 20.

When using a volume controller as the input/output device 30, for example, the input/output device 30 may have a portion that protrudes out of the surface of the liquid crystal panel 10 on the side of the viewer, for example. Also, as the portion that protrudes out from the liquid crystal panel 10, the input/output device 30 may have a wide-width part (see FIG. 3(b), for example) that has a larger diameter than the diameter of the hole 10A. Using this wide-width part to hide the non-display region RF2 around the hole can improve the sense of coherency between the input/output device 30 and the display screen. The wide-width part may be provided so as to be fixed to the input/output device 30 after the input/output device 30 is mounted on the circuit substrate 20 via the hole 10A.

The input/output device 30 may include a part that can be attached and detached and be constituted by an operating section that is arranged in the hole 10A in the display panel 10 and that is connected to the circuit substrate 20, and a stick section that can attach to and detach from the operating section, for example. In this case, the input/output device can be used as an input device such as an analog controller by the user mounting the stick section in a fitting hole or a screw hole provided in the operating section as needed.

Now, the wiring around the hole 10A in the TFT substrate 11 will be described. As disclosed in Patent Documents 2 and 3, the matrix wiring lines around the hole 10A may be formed so as be diverted around the hole 10A, for example.

Figure 3:
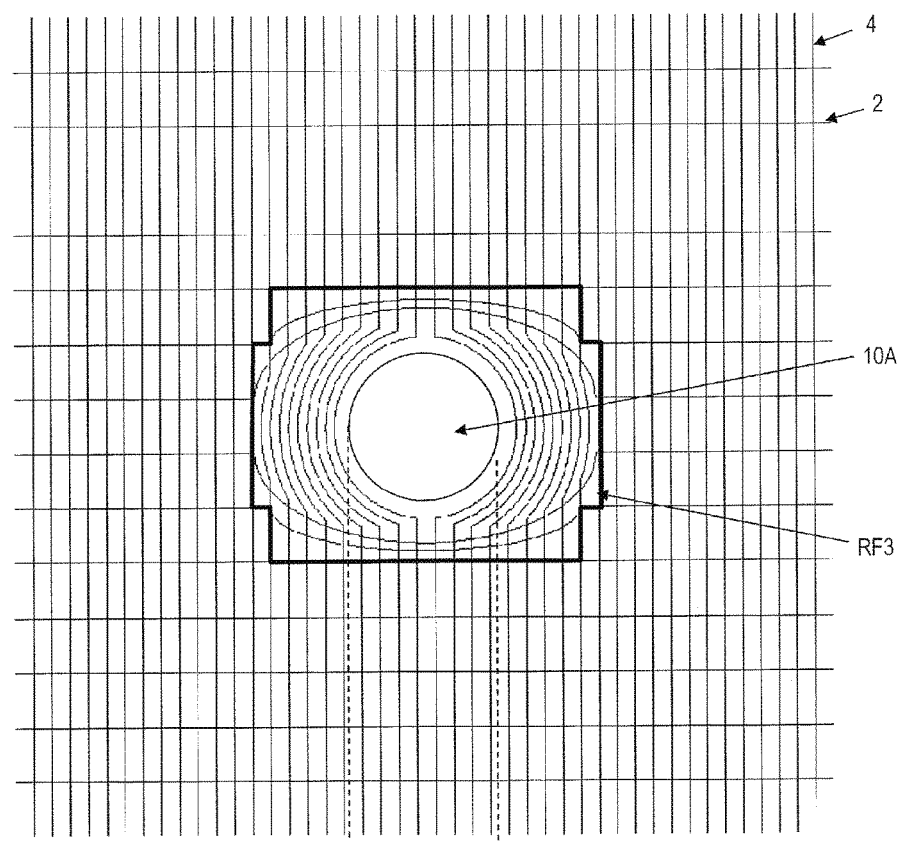
FIG. 3(a) is a view showing an example of wiring around the hole.
FIG. 3(b) is a cross-sectional view of the panel.
Figure 3:
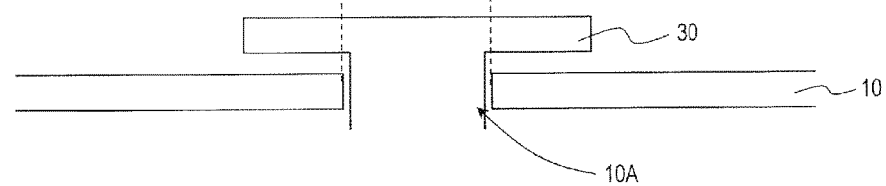

FIG. 3(a) shows one example of the wiring on the TFT substrate 11 around the hole 10A. As the figure shows, a source wiring 4 extending in the vertical direction and a gate wiring 2 extending in the horizontal direction are both provided around the hole 10A so as to be diverted around the hole 10A. In this configuration, pixels can be provided in a matrix in areas other than the area around the hole 10A, and an image or the like can be displayed by supplying a signal to the pixels via the respective TFTs connected to the gate wiring 2 and the source wiring 4. A TFT channel provided in the pixel may be formed by amorphous silicon, low temperature polysilicon showing crystalline characteristics, an oxide semiconductor such as an In—Ga—Zn—O semiconductor, or the like.

However, by allowing the wiring to be diverted around the hole 10A, a region where the pixels cannot be arranged (an alternative wiring region RF3) may be formed around the hole 10A. In this case, the alternative wiring region RF3 that cannot be used for display may be covered with a black matrix in order to prevent light leakage.

As shown in FIG. 3(b), when the input/output device 30 includes a wide-width part that protrudes from the surface of the liquid crystal panel 10 on the side of the viewer, the part may be used to hide the alternative wiring region RF3 from the viewer.

The liquid crystal display device 100 according to the present embodiment may include other various types of aspects. The liquid crystal display device 100 may be configured so as to display an image related to the input/output device 30 within the display region (around the hole or the input/output device, for example) of the liquid crystal panel 10, for example. When a volume controller is provided as the input/output device 30, the current magnitude of volume determined by the operation by the user can be displayed around the input/output device 30, for example.

Displaying information related to the input/output device 30 in the areas surrounding the device in this way can improve user-friendliness. Also, it is possible to use a display image to allow the user to recognize the current function of the current input/output device 30. Thus, the liquid crystal display device also has the advantage that the input/output device 30 is easy to apply for many purposes.

A known image processing device (image processing unit) can perform control of such displayed images around the hole. The image processing device may include a computation processing unit, a graphic processing unit, a memory, or the like provided on the circuit substrate 20, for example. The image processing device can generate image data on the basis of a signal from the input/output device 30 so as to display a related image around the input/output device 30.

Also, a touch panel may be provided on the viewer side of the liquid crystal panel 10. The touch panel may have a known configuration, and an Out-Cell, On-Cell, or In-Cell touch panel may be used as desired. In an In-Cell touch panel, electrodes that constitute a touch sensor (a plurality of sensor wiring lines) or the like are provided within the liquid crystal panel 10.

Figure 4:
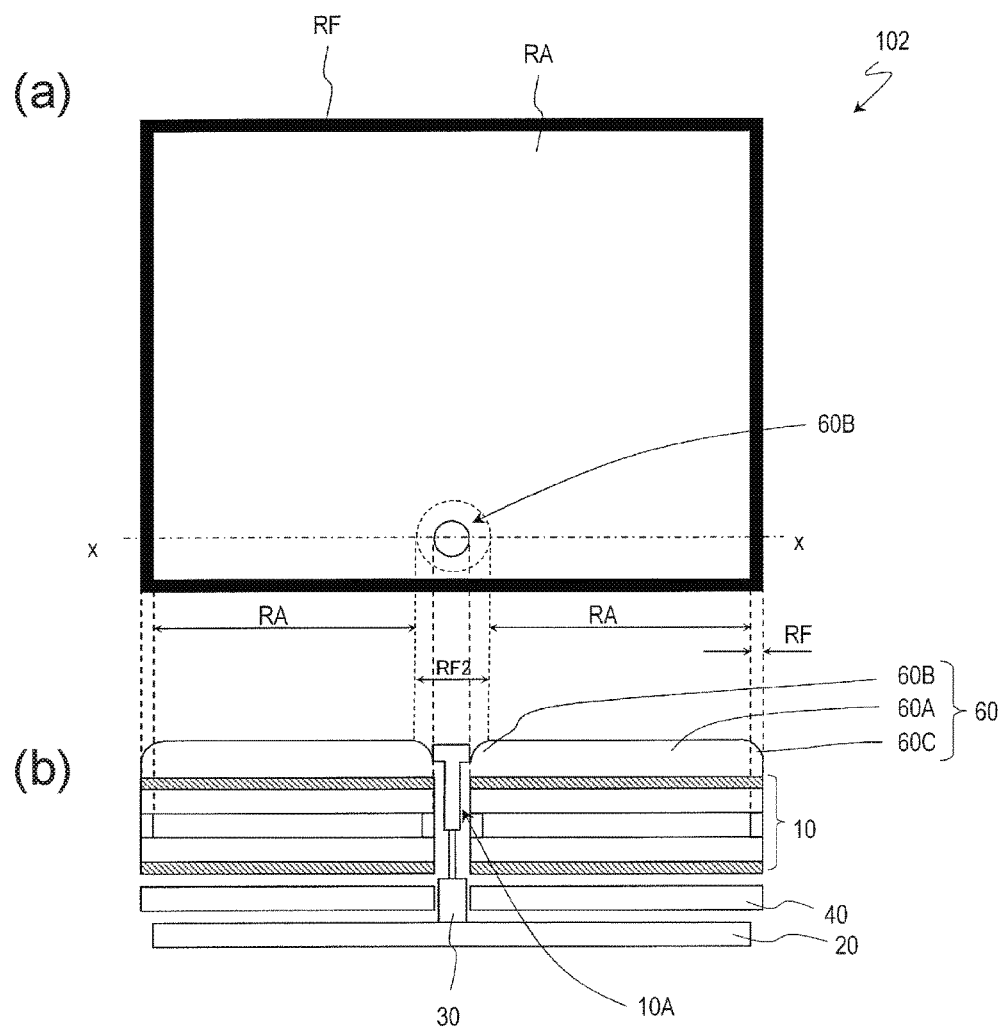
FIG. 4 is a view describing a configuration including a transmissive cover that has a lens portion.

FIGS. 4(*a*) and 4(*b*) are views showing a liquid crystal display device 102 according to a modification example of the present embodiment. FIG. 4(*a*) is a plan view seen from the user, and FIG. 4(*b*) is a cross-sectional view cut along the line x-x in FIG. 4(*a*).

As shown in FIGS. 4(*a*) and 4(*b*), the liquid crystal display device 102 also includes the hole 10A in the liquid crystal panel 10 and the input/output device 30 (here, a push-button switch) in the location corresponding to the hole 10A. The input/output device 30 is connected to the circuit substrate 20.

The liquid crystal panel 102 includes a transmissive cover 60 on the viewer side of the liquid crystal panel 10. The transmissive cover 60 is made of transmissive material such as glass or plastic and can transmit light emitted from the liquid crystal panel 10 toward the viewer. The transmissive cover 60 also includes a hole in the location that corresponds to the hole 10A of the liquid crystal panel 10, and the input/output device 30 is exposed so as to allow the user to perform operation.

The transmissive cover 60 includes a curved surface around the hole 10A. This curved part function as a lens section 60B. A flat portion 60A is provided around the lens section 60B, and a large portion of the liquid crystal panel 10 is covered by the flat portion 60A. The liquid crystal display device 102 includes a different lens portion (peripheral lens portion) 60C in the transmissive cover 60 over the periphery (the region where the frame region RF is formed) of the display panel 10.

In the liquid crystal display device 102 thus configured, light emitted from pixels near the non-display region RF2 arranged around the hole 10A refracts at the lens portion 60B (here, the user side surface of the lens portion 60B) because the transmissive cover 60 includes the lens portion 60B. In this configuration, the image formed by the pixels around the hole 10A becomes enlarged and displayed on the front surface of the non-display region RF2. Thus, the non-display region RF2 around the hole 10A can be made less noticeable to the viewer.

In this example, the shape of the curved lens surface of the lens portion 60B (more specifically, the curved line formed by the curved lens surface in a cross section) is expressed by the following aspheric formula, where R1 is the radius of curvature (or c is the curvature) and k is the aspheric coefficient (conic constant), for example.

Aspheric formula: $f(x)=Y-cx^2/(1+(1-(1+k)c^2x^2)^{1/2})$

In the above formula c=1/R1, x is the horizontal distance from the top of the lens (the boundary of the lens portion 60B and the flat portion 60A), and Y is the height at the top of the lens (the thickness of the transmissive cover 60 at the flat portion 60A). The radius of curvature R1, the conic constant k, the thickness of the transmissive cover 60 Y, and the like may be set in accordance with the width of the non-display region RF2 or the like.

A more specific shape for the lens portion 60B is described in detail in WO 2010/070871, for example. The lens surface shape described in WO 2010/070871 can also be applied to the embodiments of the present invention. The lens surface shape of the peripheral lens portion 60C may be the same.

It is preferable that the shape of the lens portion 60B around the hole 10A be part of a rotating member, for example. It should be noted that this "rotating member" means a three-dimensional figure obtained by rotating a plan view figure 360° around a straight line that is positioned in the same plane thereof. In the present embodiment, the lens portion 60B may have a shape including a rotating member in which a plan view figure thereof is disposed in a location separated from the rotational axis, and the rotating member is obtained by causing the plan view figure thereof having the curved line segment on the rotational axis-side to rotate.

The lens portions 60B and 60C are not limited to the lens configuration in which one side thereof is a convex curved surface as shown in FIG. 4(*b*) and may be configured using a Fresnel lens, for example. Moreover, both the viewer side front surface and rear surface may be formed so as to have a convex curved surface. The transmissive cover 60 may have a lens portion provided around the hole 10A and a slanted portion that is slanted from the lens portion toward the surface of the display panel and selectively covers only the portion around the hole 10A.

The display panel of Embodiment 1 was described above, and in the present embodiment, the portion around the hole 10A is sealed by two different sealing parts, the hole-periphery sealing part 13A and the sealing resin 19A. In this configuration, the degradation of display quality can be prevented because the cell thickness around the hole 10A can be kept uniform.

Embodiment 2

Figure 5:
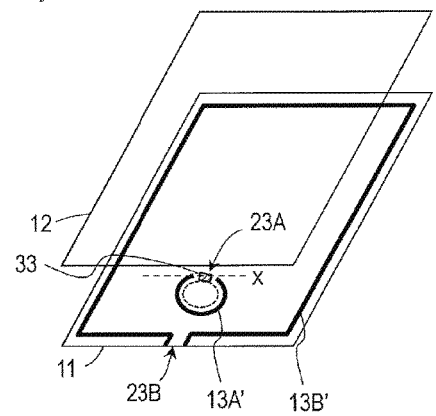
FIG. 5 is a view for describing a manufacturing process of a liquid crystal panel according to Embodiment 2 of the present invention, FIGS. 5(a1) and 5(a2) each show different steps, FIGS. 5(b1) and 5(b2) are cross-sectional views that respectively correspond to FIGS. 5(a1) and 5(a2) according to an embodiment, and FIGS. 5(c1) and 5(c2) are cross-sectional views that respectively correspond to FIGS. 5(a1) and 5(a2) according to a different embodiment.
Figure 5:
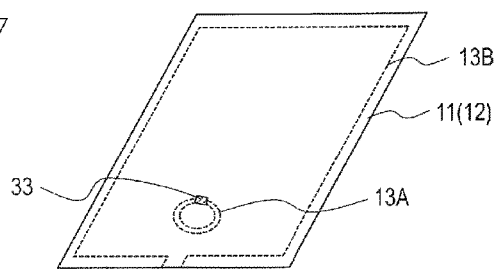
Figure 5:
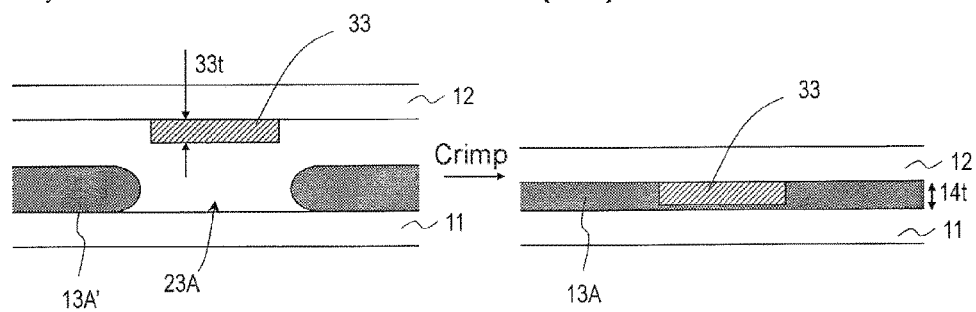
Figure 5:
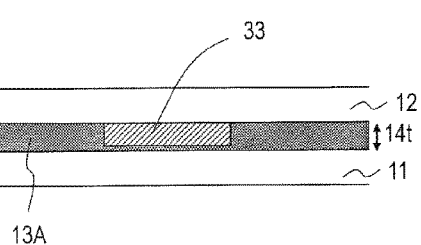
Figure 5:
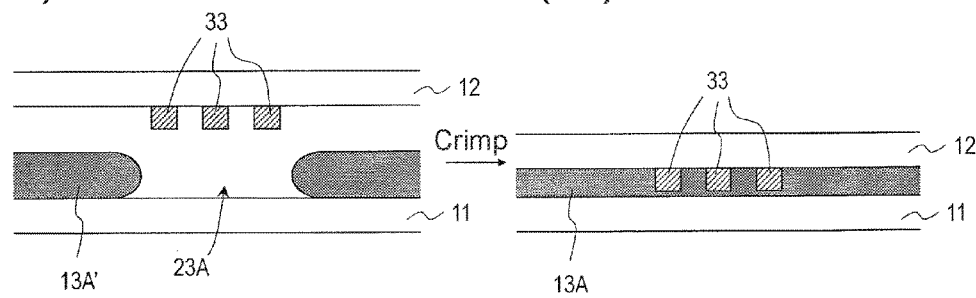
Figure 5:
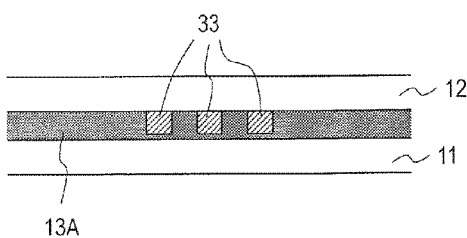

FIGS. 5(*a*1) and 5(*a*2) are perspective views showing part of a manufacturing process of a liquid crystal panel according to Embodiment 2, FIGS. 5(*b*1) and 5(*c*1) are cross-sectional views that correspond to the FIG. 5(*a*1), and FIGS. 5(*b*2) and 5(*c*2) are cross-sectional views that correspond to FIG. 5(*a*2). FIGS. 5(*b*1) and 5(*b*2) and FIGS. 5(*c*1) and 5(*c*2) show liquid crystal panels of a different configuration, respectively.

As shown in FIG. 5(*a*1), in the present embodiment, a structure 33 formed by a resin or the like is provided in the location that corresponds to an open section 23A of a hole-periphery sealing member 13A' provided on a TFT substrate 11. As shown in FIG. 5(a2), in the substrate bonding process, the hole-periphery sealing member 13A' is flattened so as to form a hole-periphery sealing part 13A in a closed-loop shape, which includes the structure 33.

Providing the structure 33 in advance on the TFT substrate 11 makes it no longer necessary, as it was in Embodiment 1, to seal the open section 23A of the hole-periphery sealing part 13A with the sealing resin 19A in a subsequent step, which simplifies the manufacturing process, for example.

The structure 33 described above may be provided on the side of the TFT substrate 11, but it can also be provided on the side of the opposite substrate 12 as shown in FIGS. 5(b1) and 5(c1). In this case, the structure 33 can be provided in the same step as the step of providing photospacers on the side of the opposite substrate 12.

The photospacers can be formed by a known photolithography process, and the structure 33 described above can be formed merely by changing a mask used in the photolithography process without adding a manufacturing step.

The structure 33 may be constituted by a single member as shown in FIG. 5(b1) or by a plurality of members as shown in FIG. 5(c1). As shown in FIGS. 5(b2) and 5(c2), either configuration can help, in the substrate bonding process, the sealing member 13A' having the open section 23A be flattened so as to take the shape of a closed-loop. Forming the hole-periphery sealing part 13A having a closed-loop shape becomes easier because providing the structure 33 requires only a small amount of the sealing member that is pushed and spread to fill the open section 23A.

It is preferable that a thickness 33t (see FIG. 5(b1)) of the structurer 33 be 30% to 100% of the thickness of a cell gap (the thickness of the display medium layer) 14t (see FIG. 5(b2)). Setting the thickness of the structure as described makes the hole-periphery sealing part 13A more likely to be continuous (a closed-loop shape) after the substrates are bonded together.

As shown in FIGS. 5(c1) and 5(c2), in order to avoid forming an airtight space inside the sealing member 13A', it is advantageous for the structure 33 to have gaps. However, in this case, the possibility that the sealing part 13A that is completely closed does not form after the substrates are bonded together increases compared to the configurations shown in FIGS. 5(b1) and 5(b2). It is preferable that these points be taken into account and the shape and the thickness of the structure 33 be chosen appropriately.

In the present embodiment, it goes without saying that the hole-periphery sealing member 13A having a broken-loop shape that includes a plurality of open sections may be provided and that a plurality of the structure 33 may be provided in advance in the respective locations corresponding to the plurality of open sections.

After an empty cell is made in this manner, in a manner similar to Embodiment 1, the liquid crystal injection process and the process of forming a through-hole 10A are performed. Through these processes, a liquid crystal panel with a hole provided in the display region can be achieved.

In the present embodiment, however, the hole 10A is already surrounded by the closed hole-periphery sealing part 13A (and the structure 33) after the substrate bonding process. Thus, unlike Embodiment 1, it is possible to form the through-hole 10A after performing the liquid crystal injection process. In addition, in the present embodiment, it is possible to provide liquid crystal material on a substrate before the substrate bonding process. A liquid crystal panel that is manufactured by these methods will be described below.

Figure 6:
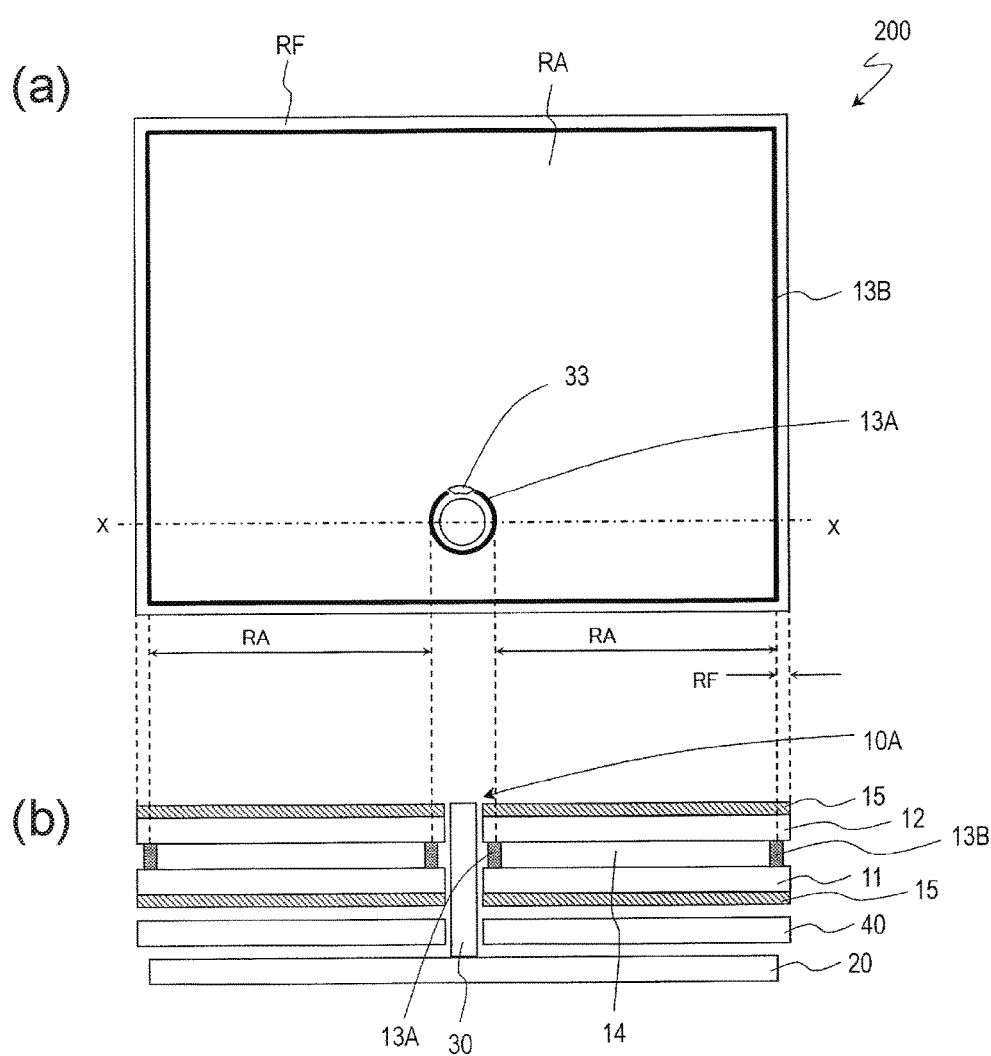
FIG. 6 is a view showing a configuration of a liquid crystal display device of Embodiment 2.

FIGS. 6(a) and 6(b) are a plan view and a cross sectional view, respectively, that show a liquid crystal display device 200 according to the present embodiment. The liquid crystal layer in the liquid crystal display device 200 is formed by the one drop fill method (ODF method), in which liquid crystal material is dripped on one of the substrates before the substrates are bonded. In this case, it is not necessary to provide a liquid crystal injection hole in the outer sealing part 13B, and the outer sealing part 13B is provided in a closed-loop shape.

Figure 7:
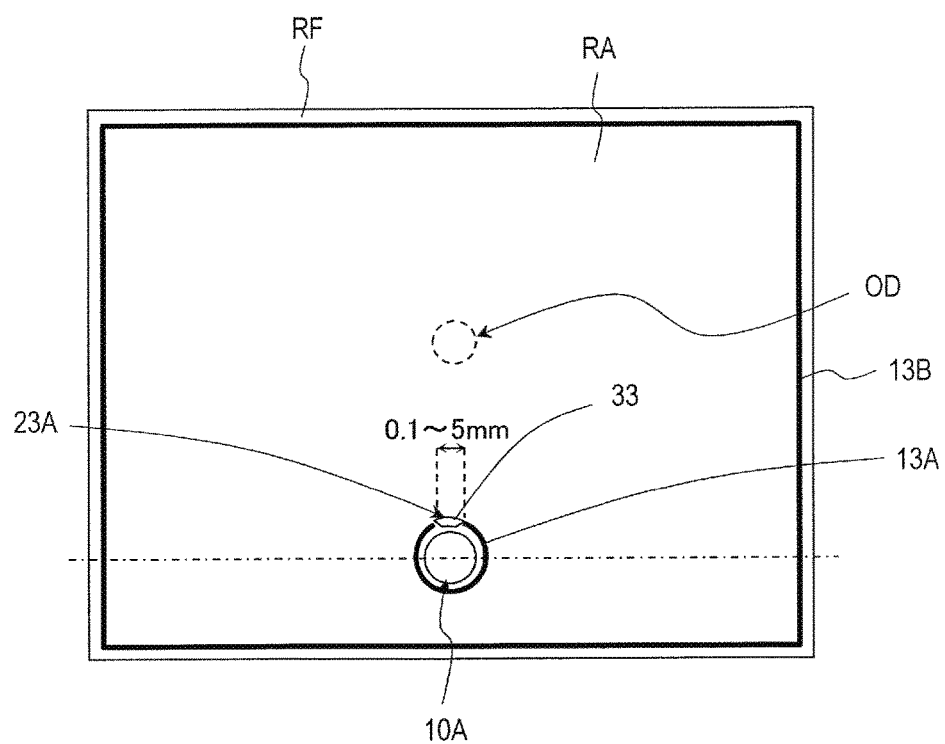
FIG. 7 is a view showing a configuration of a liquid crystal panel of Embodiment 2 and a plan view showing the location where liquid crystal is dropped or the like when forming a liquid crystal layer by the ODF method.

FIG. 7 is a view used to describe a process of manufacturing a liquid crystal panel using the ODF method. The manufacturing process of a liquid crystal panel will be described below.

First, in a manner similar to the example shown in FIG. 5(a1), the structure 33 with a height of 30% to 100% of the cell thickness is formed in the region of the opposite substrate 11 that corresponds to the open section 23A of the hole-periphery sealing member 13A' that is provided later. The width of the structure 33 can be chosen according to the width of the open section 23A and is set to approximately 0.1 mm to 4 mm, for example.

Next, the hole-periphery sealing member 13A' and the outer sealing member 13B' are provided on the TFT substrate 11 using a known dispenser device. The width of each of the sealing members 13A' and 13B' is set to approximately 1 mm, for example. However, unlike the example shown in FIG. 5(a1), the outer sealing member 13B' is provided in a closed-loop shape that does not include the injection hole 23B.

Next, as shown in FIG. 7, in a vacuum, liquid crystal material is dripped onto a location OD near the panel center on the TFT substrate 11. The location OD where liquid crystal material is dripped is inside the outer sealing member 13B' and outside the hole-periphery sealing member 13A'.

Thereafter, the hole-periphery sealing part 13A and the outer sealing part 13B are formed by curing the sealing members 13A' and 13B' with heat or ultraviolet light before the two substrates 11 and 12 are bonded together and the sealing members 13A' and 13B' make contact with liquid crystal material and after the open section 23A of the hole-periphery sealing member 13A' becomes linked via the structure 33. In this process, liquid crystal material spreads over the entire surface of the substrate and fills the inside of the panel.

Lastly, penetrating the hole 10A using a scribing step, laser, drill, or water jet completes the liquid crystal panel.

It is preferable that the length of the open section 23A of the sealing member 13A' be greater than or equal to 0.5 mm so as to prevent the open section 23A from becoming buried as soon as the substrates are bonded. However, if the length exceeds 5 mm, the chance of forming the sealing part 13A not having a closed-loop shape in the end increases. Thus, it is preferable that the length of the open section 23A be greater than or equal to 0.5 mm and less than or equal to 5.0 mm.

A display panel of Embodiment 2 was described above. In the present embodiment, the area surrounding the hole 10A is sealed by two different sealing members, which are the hole-periphery sealing part 13A and the structure 33. This configuration prevents the degradation of display quality because the cell thickness can be kept uniform even around the hole 10A.

Embodiment 3

Figure 8:
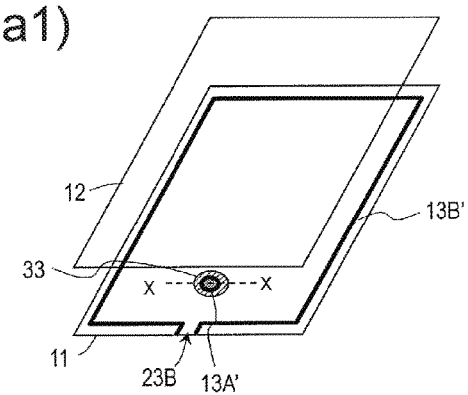
FIG. 8 is a view for describing a manufacturing process of a liquid crystal panel according to Embodiment 3 of the present invention, FIGS. 8(a1) to 8(a4) each show different steps, FIGS. 8(b1) and 8(b2) are cross-sectional views that respectively correspond to FIGS. 8(a1) and 8(a2) according to an embodiment, and FIGS. 8(c1) and 8(c2) are cross-sectional views that respectively correspond to FIGS. 8(a1) and 8(a2) according to a different embodiment.
Figure 8:
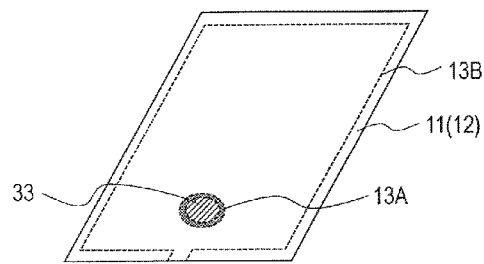
Figure 8:
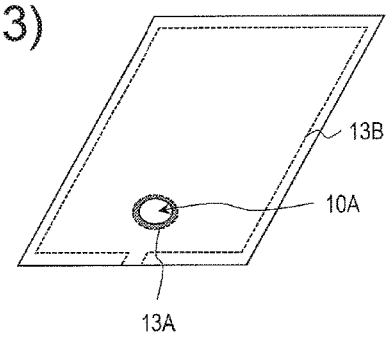
Figure 8:
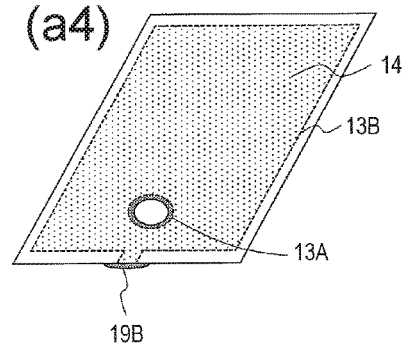
Figure 8:
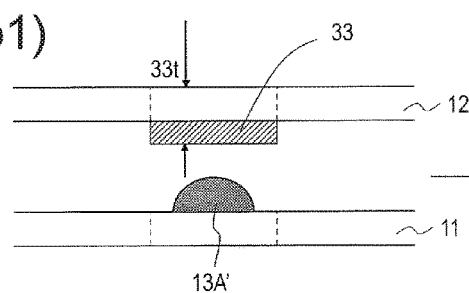
Figure 8:
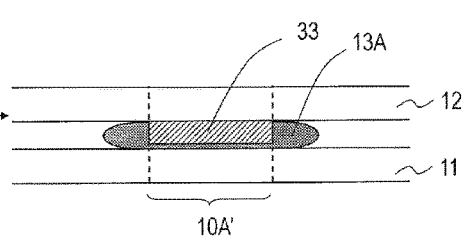
Figure 8:
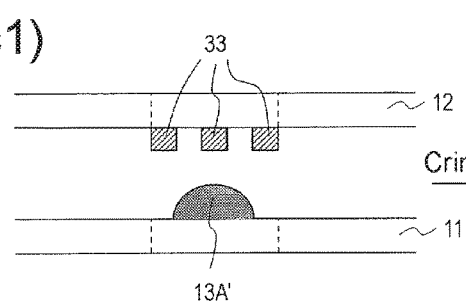
Figure 8:
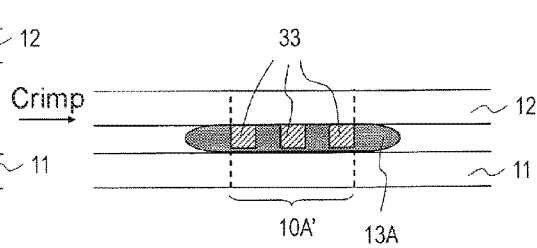

FIGS. 8(a1) to 8(a4) are perspective views showing part of a manufacturing process of a liquid crystal panel according to the present embodiment. FIGS. 8(b1) and 8(c1) are cross-sectional views that correspond to FIG. 8(a1), and FIGS. 8(b2) and 8(c2) are cross-sectional views that correspond to FIG. 8(a2). FIGS. 8(b1) and 8(b2) and FIGS. 8(c1) and 8(c2) show liquid crystal panels of a different configuration, respectively.

Unlike Embodiments 1 and 2, in which the sealing member 13A' used to form the hole-periphery sealing part 13A on one of the substrates had a shape of a broken loop having an open section, a hole-periphery sealing part 13A in the present embodiment is formed by providing a sealing member in a dot shape or a planer shape and pushing and spreading the sealing member. A more specific description will be provided below.

First, a TFT substrate 11 and an opposite substrate 12 are prepared. However, in the present embodiment, a structure 33 is provided at the location on the opposite substrate 12 where a hole will be formed in a subsequent step as shown in FIGS. 8(b1) and 8(c1). Typically, the structure 33 has approximately the same size as the size of the hole 10A to be formed.

Next, as shown in FIG. 8(a1), sealing members 13A' and 13B' are provided on the TFT substrate 11 using a known method and using a dispenser or the like. In the present embodiment also, the outer hole-periphery sealing member 13B' is provided at the periphery of the TFT substrate 11, and the hole-periphery sealing member 13A' is provided in a region where a through-hole 10A (see FIG. 1(a3)) is formed in a subsequent step. The hole-periphery sealing member 13A' is provided at a prescribed location inside the region enclosed by the outer sealing member 13B'.

However, in the present embodiment, the hole-periphery sealing member 13A' is provided on the TFT substrate 11 in a dot shape or a planar shape. In other words, unlike Embodiments 1 and 2, the hole-periphery sealing member 13A' is provided so as to avoid providing an empty space in the inside thereof.

Thereafter, as shown in FIG. 8(a2), a pair of substrates are bonded together. In this step, as shown in FIGS. 8(b2) and 8(c2), the structure 33 makes contact with the hole-periphery sealing member 13A' and the sealing member 13A' become pushed and spread. Because of this, the hole-periphery sealing member 13A' spreads beyond the region where the hole 10A is formed and spreads to the outside of the region.

This bonding process prevents an increase in the cell thickness around the hole-periphery sealing member 13A' because the hole-periphery sealing member 13A' does not form an airtight space in the inside thereof in a manner similar to the reference example shown in FIG. 16.

The height of the structure 33 is set to a thickness that is 30% to 100% of the cell thickness, for example. Setting the thickness of the structure as described allows the sealing member to be appropriately spread out by the structure 33 in the substrates bonding process. In particular, as shown in FIG. 8(c2), a configuration in which the structure 33 is constituted by a plurality of members can improve productivity more because it can be easier to push and spread the sealing member suitably even when the bonding pressure is relatively small.

An appropriate choice of the planar shape of the structure 33 can allow the shape of the hole-periphery sealing part 13A that is formed to be controlled. Thus, it is preferable that the structure 33 have a planer shape that is close to the hole 10A that is formed and the sealing part be formed by providing sealing material in the middle thereof.

Embodiment 4

Figure 9:
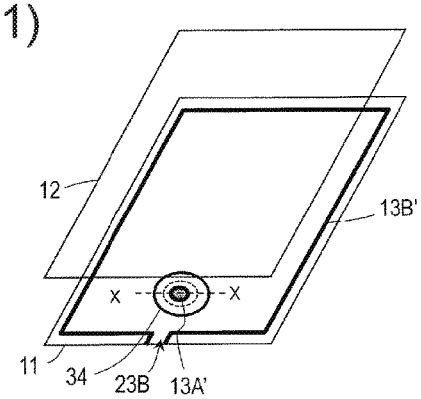
FIG. 9 is a view for describing the manufacturing process of a liquid crystal panel according to Embodiment 4 of the present invention, FIGS. 9(a1) to 9(a4) each show different steps, and FIGS. 9(b1) to 9(b3) are cross-sectional views that respectively correspond to FIGS. 9(a1) to 9(a3).
Figure 9:
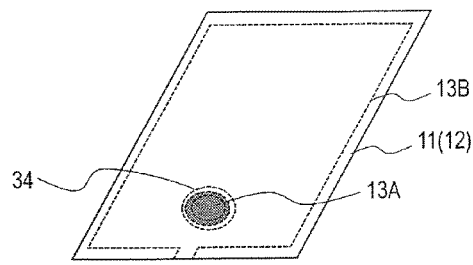
Figure 9:
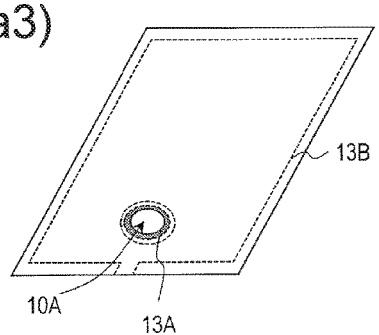
Figure 9:
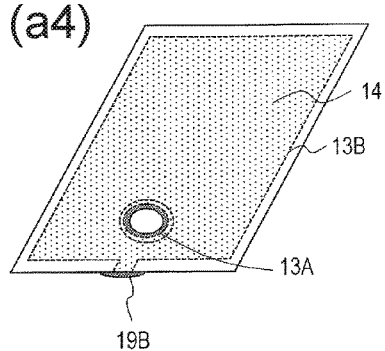
Figure 9:
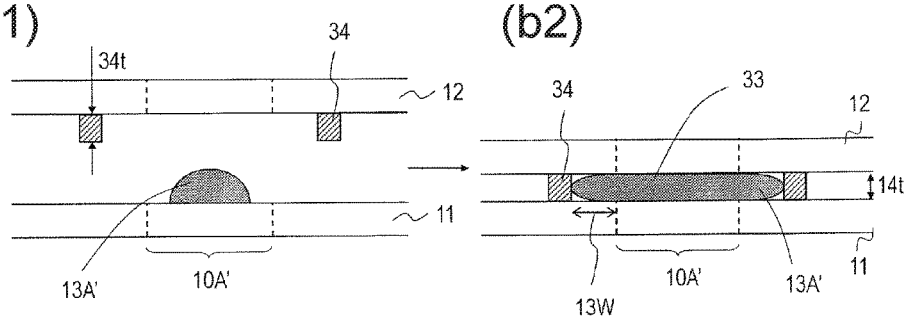
Figure 9:
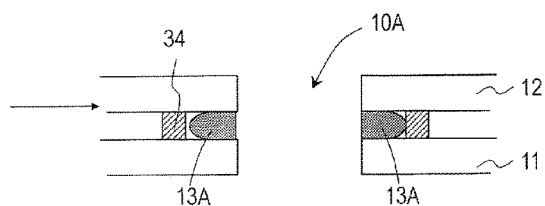

FIGS. 9(a1) to 9(a4) are perspective views showing part of a manufacturing process of a liquid crystal panel according to Embodiment 4. FIGS. 9(b1) to 9(b3) are cross-sectional views cut along the line x-x respectively corresponding to FIGS. 9(a1) to 9(a3).

Unlike Embodiment 3 in which the structure 33 is provided so as to overlap with the region 10A' where the hole is formed, in the present embodiment, a bank-like loop-shaped structure 34 having an inner wall around the hole-forming region 10A' is provided. Typically, as shown in FIG. 9(b1), the structure 34 is provided on the opposite substrate 12 so as to enclose the outer side of the hole-forming region 10A'.

As shown in FIG. 9(b2), because the structure 34 is provided, the structure 34 prevents the spread of a sealing member 13A' in the substrate bonding process. This configuration can form a hole-periphery sealing part 13A in a desired shape. In this manner, the structure 34 functioning as a bank (dam) holds in the sealing member 13A', which is advantageous in that a seal width 13W (see FIG. 9(b2)) can be controlled precisely.

Thereafter, a through-hole 10A is formed as shown in FIGS. 9(a3) and 9(b3). The area around the through-hole 10A is surrounded by the hole-periphery sealing part 13A and the structure 34. This configuration can prevent the introduction of impurities into the liquid crystal layer or similar undesirable phenomena while reducing the non-display region because the structure 34 precisely controls the width of the hole-periphery sealing part 13A.

A thickness 34t (see FIG. 9(b1)) of the structure 34 is set 30% to 100% of a cell gap 14t (see FIG. 9(b2)), for example. The structure 34 may be formed in the same step as the step in which photospacers, formed in the pixel region, are formed, and the structure 34 itself can be used as a spacer by setting the height of the structure 34 to be approximately the same as the cell gap.

Embodiment 5

Figure 10:
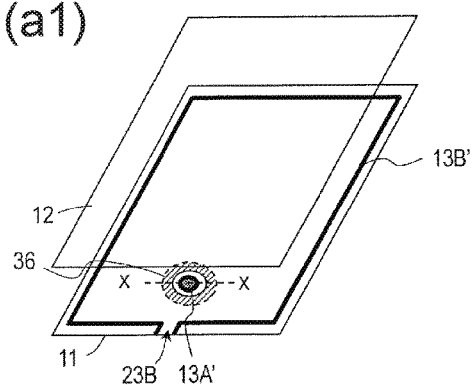
FIG. 10 is a view for describing the manufacturing process of a liquid crystal panel according to Embodiment 5 of the present invention, FIGS. 10(a1) to 10(a4) each show different steps, and FIGS. 10(b1) to 10(b3) are cross-sectional views that respectively correspond to FIGS. 10(a1) to 10(a3).
Figure 10:
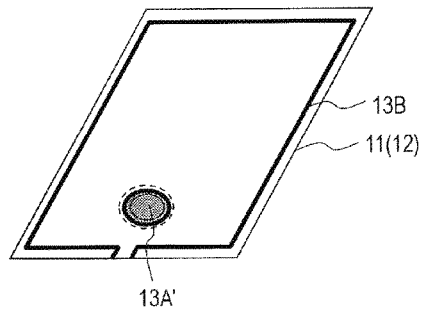
Figure 10:
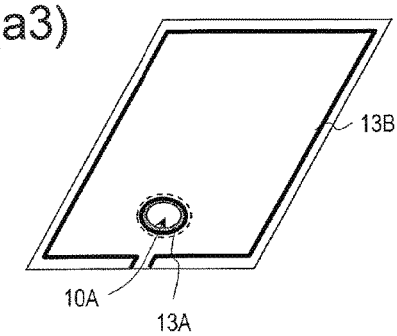
Figure 10:
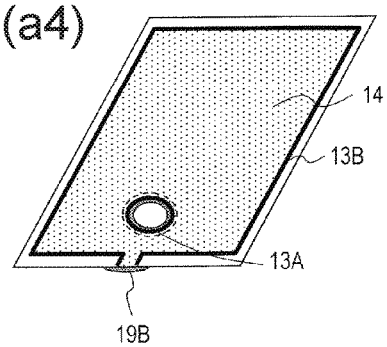
Figure 10:
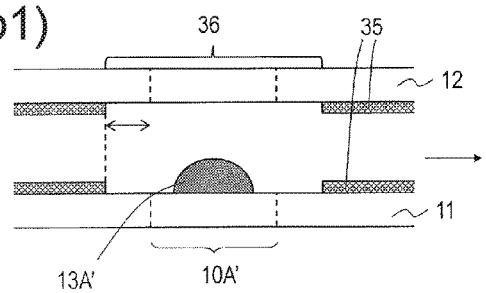
Figure 10:
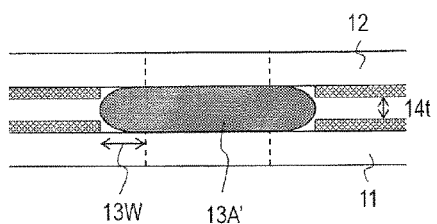
Figure 10:
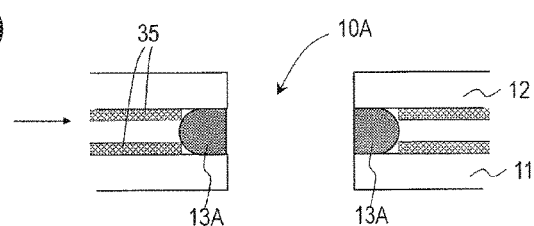

FIGS. 10(a1) to 10(a4) are perspective views showing part of a manufacturing process of a liquid crystal panel according to Embodiment 5. FIGS. 10(b1) to 10(b3) are cross-sectional views cut along the line x-x respectively corresponding to FIGS. 10(a1) to 10(a3).

In the present embodiment, instead of separately providing the structure 34 used to prevent the spread of the sealing member 13A' as in Embodiment 4, the spread of a sealing member 13A' is restrained by arranging the edge of a layered structure provided on a substrate around the hole (in other words, the opening of the layered structure is provided around the hole). In this configuration, the sealing member 13A' can be pushed and spread to a prescribed region in the substrate bonding process.

As shown in FIG. 10(b1), a layered structure 35 provided on an opposite substrate 12 may include a color filter layer (1 to 2 μm) and an overcoat layer (2 to 3 μm). The layered structure 35 provided on the TFT substrate 11 may include an inorganic protective film (approximately 0.2 μm) that covers the TFTs and a planarizing film (2 to 3 μm) made of organic insulating material or the like.

A region 36 where the layered structure 35 is not formed is a region where the cell thickness is thick. The region 36 where the cell thickness is thick described above (namely, the opening region 36 of the layered structure 35) is formed such that a hole-forming region 10A' is arranged inside the region.

When providing the sealing member 13A' in a dot shape or a planar shape as shown in FIGS. 10(a1) and 10(b1) and thereafter bonding the substrates together as shown in FIGS. 10(a2) and 10(b2), providing the opening region 36 of the layered structure 35 stops the spread of the sealing member 13A' near the edge of the layered structure 35. This is because while the sealing member 13A' is easy to be pushed and spread in the opening region 36 where the cell thickness is large, the region where the layered structure 35 is located has a small cell thickness, which makes it harder for the sealing member 13A' to enter the gap. However, a small amount of the sealing member 13A' may also enter into the region where the layered structure 35 is located. Although it depends on the display mode, a cell thickness 14t of the display area is set to approximately 3 μm, for example.

After the substrates are bonded to each other, the sealing member 13A' is cured by heat, ultraviolet light, or the like. The cured sealing member 13A' is provided in the opening region 36 of the layered structure 35, namely, in such a way that the sealing member covers the hole-forming region 10A' and a region with a prescribed width on the outer side thereof.

Thereafter, as shown in FIGS. 10(a3) and 10(b3), the hole 10A is formed. However, in a manner similar to Embodiment 4, the area around the hole 10A is sealed by the hole-periphery sealing part 13A. Furthermore, a liquid crystal panel is completed by injecting liquid crystal material into an empty cell using the vacuum injection method and sealing the injection hole.

Figure 11:
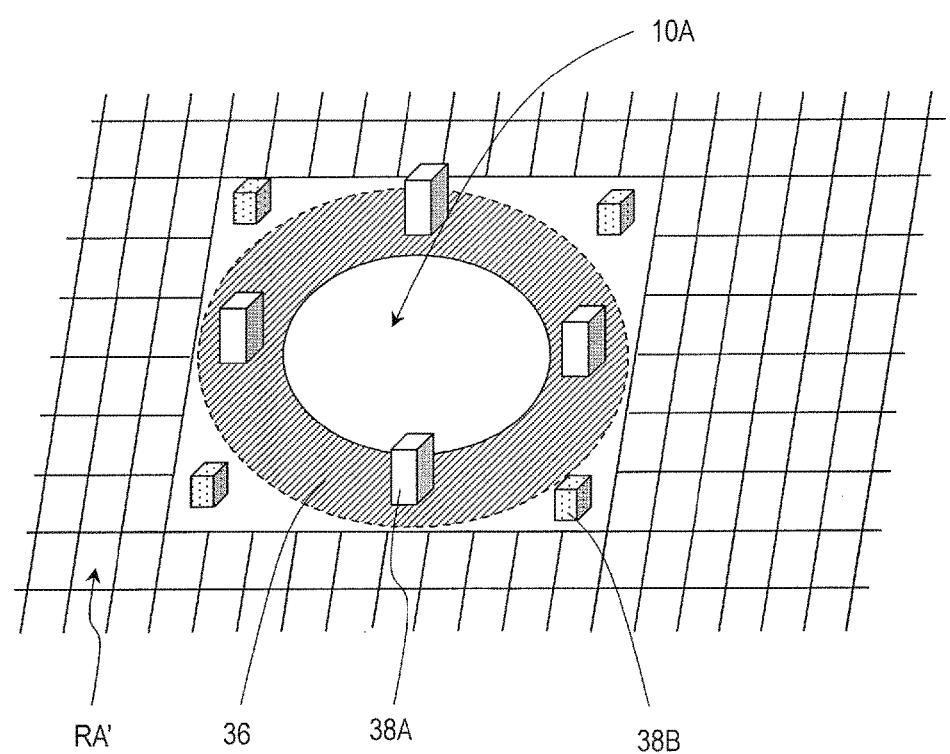
FIG. 11 is a partial magnified view showing a configuration around the hole in the liquid crystal display device of Embodiment 5.

FIG. 11 is a magnified view showing the area around the hole 10A. As described above, spacers 38B may be provided between the opening region 36 where the cell thickness is thick and a pixel forming region RA'. In particular, in a case in which the shape of the hole 10A includes a curved portion, if pixels are arranged in a matrix, a region where no pixels are arranged can be formed in all directions around hole 10A as shown in the figure. The spacers 38B arranged in this region are disposed on top of a layer such as an overcoat layer, which is formed as a base layer. Even when the spacers have the same height as column-shaped spacers arranged within the pixel region, the spacers 38B allow a desired cell thickness to be maintained. Thus, it is easy to form the spacers 38 and the column-shaped spacers arranged within the pixel region at the same time. In this case, it is not necessary to complicate the manufacturing process because it is sufficient to modify the exposure mask in the conventional manufacturing process. However, as shown in the figure, spacers 38A may be provided in the region 36 where the cell thickness is thick. The height of the spacers 38A in this case may be higher than the other spacers 38B.

Figure 12:
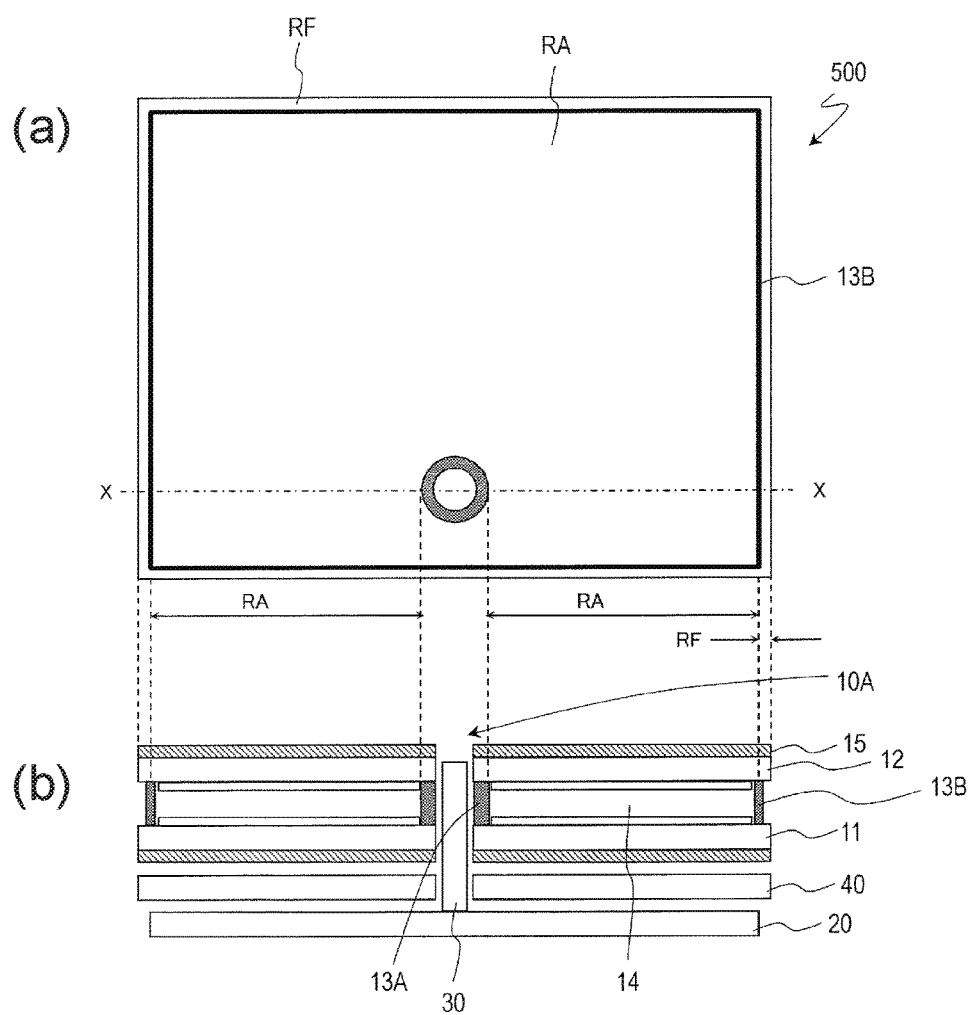
FIG. 12 is a view showing a configuration of a liquid crystal display device of Embodiment 5.

FIGS. 12(a) and 12(b) are a plan view and a cross sectional view, respectively, that show a liquid crystal display device 500 according to the present embodiment. The liquid crystal display device 500 is a configuration in which a liquid crystal layer is formed by the ODF method, in which liquid crystal material is dripped on one of the substrates before the substrates are bonded together. In this case, providing a liquid crystal injection hole in the outer sealing member 13B is not necessary, and the outer sealing member 13B is provided in a closed-loop shape.

Figure 13:
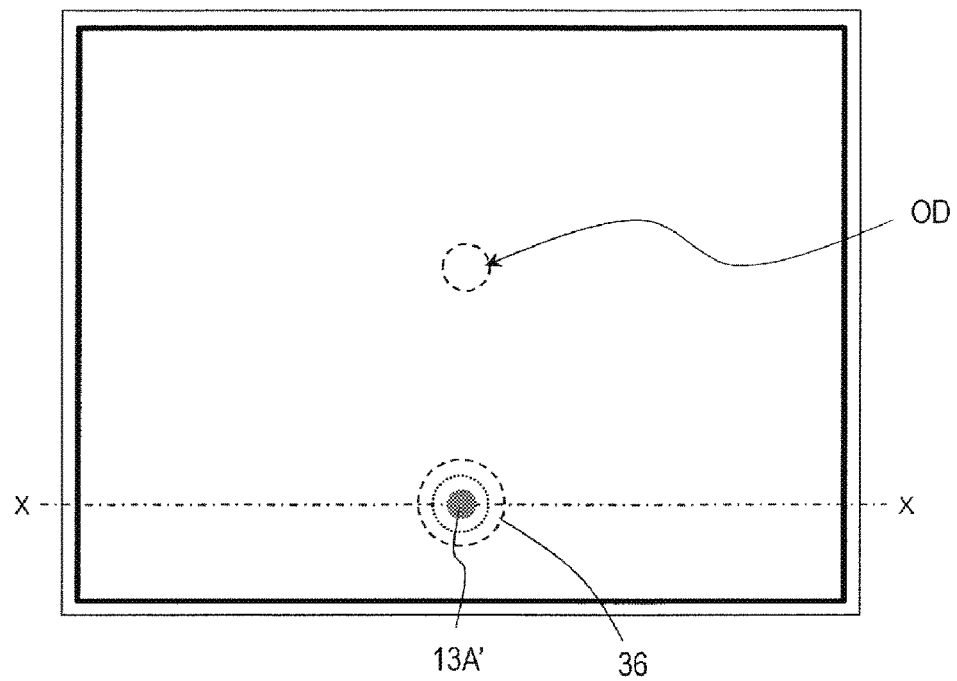
FIG. 13 is a view showing a configuration of a liquid crystal display device of Embodiment 5.

FIGS. 13(a) to 13(c) are views used to describe a process of manufacturing a liquid crystal panel using the ODF method. In particular, a liquid crystal panel can be manufactured by the following processes.

First, the TFT substrate 11 and the opposite substrate 12 are prepared. As shown in FIG. 13(b), a black matrix, a color filter layer 18a, and an overcoat layer 18b provided on the opposite substrate 12 and a protective layer (passivation layer) 17a and an insulating layer between organic layers 17b provided on the TFT substrate 11 include the opening region 36 therein. In this configuration, the cell thickness in the opening region 36 is about 4 μm thicker than the cell thickness (about 3 μm) in the display pixel region 37.

Also, the sealing member 13A' on the TFT substrate 11 is provided in the middle of the region forming the hole 10A in a shape that corresponds to the shape of the hole 10A that should be formed. After providing the sealing member 13A', as shown in FIG. 13(a), liquid crystal material is dripped, in a vacuum, onto a location OD near the middle of the TFT substrate 11.

Thereafter, as shown in FIGS. 13(b) and 13(c), bonding the opposite substrate 12 to the TFT substrate 11 spreads the sealing member 13A'. At the same time, liquid crystal material also spreads over the entire surface of the panel.

In this process, the speed at which the sealing member 13A' spreads is fast in the opening region 36 where the cell thickness is large, but the speed at which the sealing member 13A' spreads is slow in the display pixel region 37 where the cell thickness is small. Thus, the sealing member 13A' is pushed and spread so as to spread over the entire opening region 36 where the cell thickness is large.

Some gap L between the edge of the opening region 36 and a pixel (pixel electrode/the edge of the opposite electrodes 16) should be provided because the sealing member 13A' may also enter into the display pixel region 37. Though it depends on the shape of the hole 10A, the appropriate length of the gap L is approximately 0.1 mm to 1 mm.

The substrates are bonded together in this manner, and the seal is cured by heat or ultraviolet light before the sealing member makes contact with liquid crystal material and after the sealing member has sufficiently spread over the region 36 where the cell thickness is thick.

Thereafter, a liquid crystal panel is completed by penetrating a hole using a method such as scribing, using a laser, or drilling.

The black matrix layer included in the color filter layer may remain around the hole 10A. This can effectively prevent light leakage around the hole.

Other Embodiments

Figure 14:
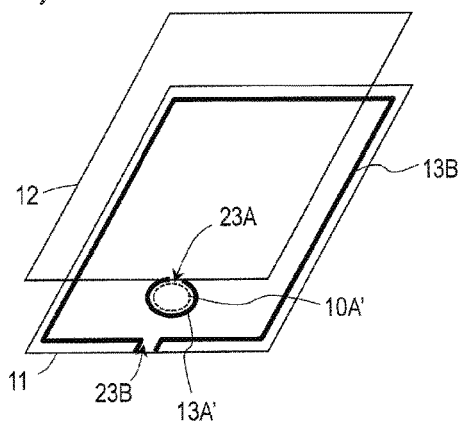
FIG. 14 is a view for describing the manufacturing process of a liquid crystal panel according to other embodiments, and FIGS. 14(a1) to 14(a4) each show different steps.
Figure 14:
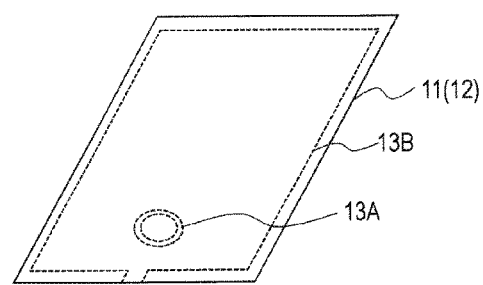
Figure 14:
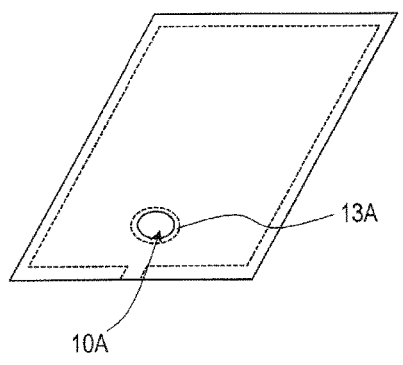
Figure 14:
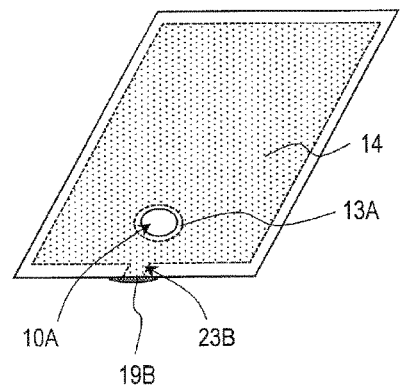

As other embodiments, as shown in FIGS. 14(a1) to 14(a4), the hole-periphery sealing member 13A' having a shape of a broken loop that has an open section 23A may be provided on one substrate 11 so as to enclose the hole-forming region 10A'. The hole-periphery sealing member 13A may be formed by crimping the sealing member to the other substrate 12 so as to close the loop. In this case, it is preferable that the length of the open section 23A be set to be about 0.1 mm to 5.0 mm, for example.

In the hole-periphery sealing part 13A formed in a loop shape in this manner, the open section 23A is closed by the flattening of the sealing member 13A'. Thus, the part corresponding to the open section 23A may have a width that is narrower than other parts.

When the loop of the hole-periphery sealing part 13A is not closed after the substrates 11 and 12 are bonded together, a sealing resin 19A may be used to fill the open section as described in Embodiment 1.

Figure 15:
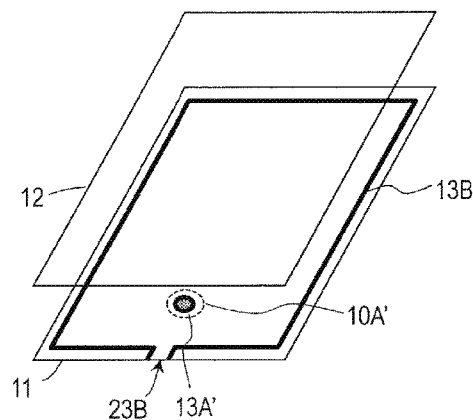
FIG. 15 is a view for describing the manufacturing process of a liquid crystal panel according to other embodiments, and FIGS. 15(a1) to 15(a4) each show different steps.
Figure 15:
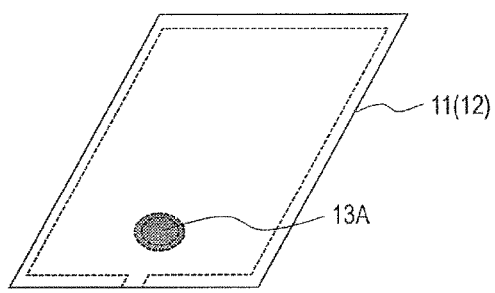
Figure 15:
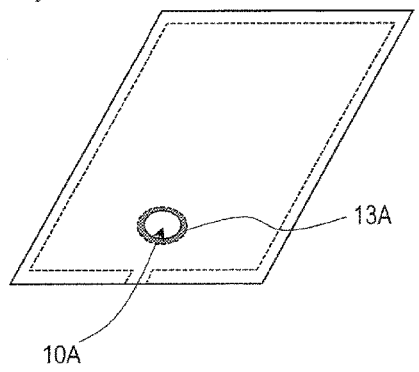
Figure 15:
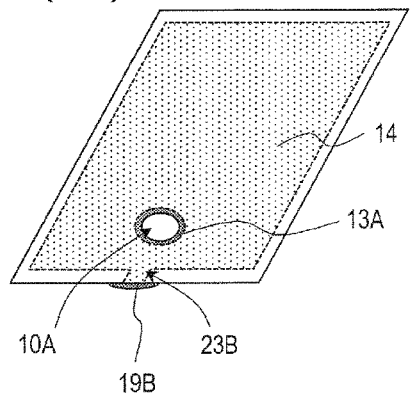

Also, as shown in FIGS. 15(a1) to 15(a4), the sealing member 13A' may be provided in a dot shape or a planar shape within the hole-forming region 10A' and pushed and spread at the time of substrate bonding process so as to form the hole-periphery sealing part 13A.

Embodiments of the present invention were described above, but it is apparent that various modifications can be made. An example was described in which a liquid crystal panel is used as the display panel, but the present invention is not limited to this, for example. As for the display panel, the present invention can be applied to a display panel having a liquid display medium layer such as an electrophoretic display panel or an electro-wetting display panel.

The present specification discloses a display panel, an electronic device, and a manufacturing method of a liquid crystal panel that are described below.

<Item 1>

A display panel including a substrate and a display medium layer held on the substrate, the display panel having a display region and a frame region outside the display region and including a hole on an inner side of the frame region penetrating the substrate and the display medium layer, the display panel further comprising: a hole-periphery sealing part disposed on the substrate at a side facing the display medium layer so as to surround the hole, wherein the hole-periphery sealing part includes: a first sealing member having a loop shape or a broken loop shape, surrounding the hole, having at least one open section; and at least one second sealing member provided at a location corresponding to the at least one open section so as to seal said at least one open section.

According to the display panel described in item 1, display quality can be improved because increase in the cell thickness around the hole can be prevented.

<Item 2>

The display panel described in item 1, wherein the first sealing member is formed in the broken loop shape having the at least open section, and the at least one second sealing member is a sealing member that seals an opening formed by the at least one open section.

According to the display panel described in item 2, the display medium layer can be held appropriately between the substrates.

<Item 3>

The display panel described in item 1, wherein the first sealing member is formed in the loop shape, and the at least one second sealing member is a protruding structure provided so as to overlap with the part of the loop defined by the first sealing member.

According to the display panel described in item 3, the display medium layer can be held appropriately between the substrates.

<Item 4>

The display panel described in item 3, wherein a thickness of the protruding structure is 30% to 100% of a thickness of the display medium layer.

According to the display panel described in item 4, the display medium layer can be held appropriately between the substrates.

<Item 5>

The display panel described in any one of items 1 to 4, wherein the first sealing part is formed by a sealing member provided on the substrate so as to form a broken loop shape having at least one open section, and wherein the at least one second sealing part is provided at a location corresponding to the open section of the sealing member.

According to the display panel described in item 5, the display medium layer can be held appropriately between the substrates while suitably preventing an increase in the cell thickness around the hole.

<Item 6>

A display panel including a substrate and a display medium layer held on the substrate, the display panel having a display region and a frame region outside the display region and including a hole on an inner side of the frame region penetrating the substrate and the display medium layer, the display panel further including: a hole-periphery sealing part formed by expanding, in a planar direction, a sealing member having a dot shape or a planar shape that is provided, before the hole is formed, at a location on the substrate where the hole is to be formed, the substrate further having a restricting structure that hinders the expansion of the sealing member.

According to the display panel described in item 6, display quality can be improved because the shape of the hole-periphery sealing part can be controlled while preventing an increase in the cell thickness around the hole.

<Item 7>

The display panel described in item 6, wherein the restricting structure is a bank-like loop-shaped structure glued to an outer side of the hole-periphery sealing part and surrounding the hole-periphery sealing part.

According to the display panel described in item 7, it is easier to form the sealing member in a desired shape.

<Item 8>

A display panel including a substrate and a display medium layer held on the substrate, the display panel having a display region and a frame region outside the display region and including a hole within the frame region penetrating the substrate and the display medium layer; a hole-periphery sealing part disposed on the substrate at a side facing the display medium layer so as to surround the hole; and a layered structure provided on the substrate, the layered structure covering the display region, wherein a loop-shaped region where the layered structure is not formed is provided around the hole, and the hole-periphery sealing part is arranged in the loop-shaped region.

According to the display panel described in item 8, display quality can be improved because the shape of the hole-periphery sealing part can be controlled while preventing an increase in the cell thickness around the hole.

<Item 9>

The display panel described in item 8, wherein the substrate is an opposite substrate, and the layered structure includes a color filter layer.

According to the display panel described in item 9, the hole-periphery sealing part can be formed suitably by providing an opening in the color filter layer having the shape of the opposite substrate or the like.

<Item 10>

An electronic device including: the display panel according to any one of items 1 to 9; and an input/output device arranged in the hole in the display panel.

According to the electronic device described in item 10, display quality around the hole in an electronic device provided with an input/output device within the display region can be improved.

<Item 11>

A method of manufacturing a liquid crystal panel, including: a step of preparing a pair of substrates; a step of providing an outer sealing member having a closed-loop shape along a periphery of one of the pair of substrates and a hole-periphery sealing member in a broken loop shape, a dot shape, or a planar shape at a prescribed location within a region inside the outer sealing member; a step of dripping liquid crystal material on a location inside the outer sealing member and outside the hole-periphery sealing member in the one of the substrates; and a step of bonding one substrate on which the liquid crystal material is dripped to another substrate, wherein the method further includes a step of forming the hole-periphery sealing part in a loop shape or a planar shape by curing the hole-periphery sealing member after flattening the hole-periphery sealing member between the pair of substrates and spreading the liquid crystal material between the pair of substrates, and a step of forming a through-hole within the hole-periphery sealing part in the loop shape or the planar shape.

According to a manufacturing process of the liquid crystal panel of item 11, a liquid crystal panel having a hole within the display region can be manufactured using the one drop fill method, and the degradation of display quality around the hole can be prevented.

INDUSTRIAL APPLICABILITY

A display device according to the respective embodiments of the present invention is widely used in various types of electronic devices such as mobile gaming devices or smartphones.

DESCRIPTION OF REFERENCE CHARACTERS 100 liquid crystal display device (electronic device)
10 liquid crystal panel
10A through-hole
11 TFT substrate
12 opposite substrate
13 sealing member
13A hole-periphery sealing part
13B outer sealing part
14 liquid crystal layer
15 optical film layer
20 driver circuit
30 input/output device
35 layered structure (color filter layer, interlayer insulating film, etc.)
40 backlight
RF frame region (non-active area)
RF2 non-display region (around the hole)
RA display region (active area)

What is claimed is:

1. A display panel comprising a substrate and a display medium layer held on the substrate, said display panel having a display region and a frame region outside the display region and including a hole on an inner side of the frame region penetrating the substrate and the display medium layer, the display panel further comprising:
   a hole-periphery sealing part formed by expanding, in a planar direction, a sealing member having a dot shape or a planar shape that is provided, before the hole is formed, at a location on the substrate where the hole is to be formed until the sealing member reaches a restricting structure that hinders the expansion of the sealing member so that after drilling the hole, the hole-periphery sealing part has a loop shape of the sealing member bordered by the restricting structure.

2. The display panel according to claim 1, wherein the restricting structure is
   a layered structure provided on the substrate, said layered structure covering the display region.

3. An intermediate panel for manufacturing a display panel, the intermediate panel comprising an upper substrate, a lower substrate, and a display medium layer held between the upper and lower substrates, said intermediate panel having a display region and a frame region outside the display region and having an area on an inner side of the frame region in which a hole penetrating the substrate and the display medium layer is to be formed, the intermediate panel further comprising:
   a hole-periphery sealing part covering the area in which the hole is to be formed,
   wherein the hole-periphery sealing part is made of: a first sealing member on the lower substrate having a round shape covering the area in which the hole is to be formed; and at least one second sealing member provided on the upper substrate pressing down a part of the round shape defined by the first sealing member.

4. A display panel made by forming the hole in the intermediate panel as set forth in claim 3 at the area in which the hole is to be formed,
   wherein, as a result of forming the hole, the hole-periphery sealing part includes at least a remaining loop-shaped portion of the first sealing member surrounding the hole, and a gap between the lower and upper substrates defined by said remaining loop-shaped portion being the same as a gap defined between the lower and upper substrates in other locations in the display panel.

* * * * *